(12) United States Patent
Katti et al.

(10) Patent No.: US 12,254,003 B2
(45) Date of Patent: Mar. 18, 2025

(54) APPARATUS, METHOD, AND COMPUTER PROGRAM PRODUCT FOR QUERYING OBJECT MODELS FOR OPERATIONAL SYSTEMS

(71) Applicant: Honeywell International Inc., Charlotte, NC (US)

(72) Inventors: Shirish Katti, Bangalore (IN); Sumanth Pachipulusu Lingesh, Bengaluru (IN); Veeranagegowda Shivalingappa, Chitradurga (IN); Klaus Peter Gross, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 181 days.

(21) Appl. No.: 18/188,824

(22) Filed: Mar. 23, 2023

(65) Prior Publication Data
US 2024/0320214 A1 Sep. 26, 2024

(51) Int. Cl.
*G06F 16/00* (2019.01)
*G06F 16/242* (2019.01)
*G06F 16/248* (2019.01)

(52) U.S. Cl.
CPC ........ *G06F 16/2428* (2019.01); *G06F 16/248* (2019.01)

(58) Field of Classification Search
CPC ............................ G06F 16/2428; G06F 16/248
See application file for complete search history.

(56) References Cited

U.S. PATENT DOCUMENTS

| | | |
|---|---|---|
| 6,466,931 B1 | 10/2002 | Attaluri et al. |
| 11,269,876 B1 * | 3/2022 | Basavaiah ................ G06F 8/77 |
| 11,341,126 B2 | 5/2022 | Panuganty et al. |
| 2012/0317088 A1 | 12/2012 | Pantel et al. |
| 2019/0121801 A1 | 4/2019 | Jethwa et al. |
| 2022/0351056 A1 | 11/2022 | De Bayser et al. |
| 2022/0414110 A1 | 12/2022 | Vasudevalu et al. |

FOREIGN PATENT DOCUMENTS

WO 2011/112744 A2 9/2011

* cited by examiner

*Primary Examiner* — Tyler J Torgrimson
(74) *Attorney, Agent, or Firm* — ALSTON & BIRD LLP

(57) ABSTRACT

An extensible object model system for maintaining extensible object models representing operational systems enables saving and re-using of searches of the models by maintaining a database of search objects representing types of search operations associated with the extensible object models. Search selection input and/or parameter selection input are received via a search selection interface with respect to a particular extensible object model, the search selection input indicating a selected search object and the parameter selection input indicating values corresponding to input parameters required by the selected search object. The extensible object model system retrieves the selected search object from the search object database, generates an executable search query representing a particular instance of the type of search operation defined by the selected search object based on the retrieved search object and the input parameter values and submits the executable search query for execution against the particular extensible object model.

20 Claims, 9 Drawing Sheets

APPARATUS, METHOD, AND COMPUTER PROGRAM PRODUCT FOR QUERYING OBJECT MODELS FOR OPERATIONAL SYSTEMS

TECHNICAL FIELD

Embodiments of the present disclosure generally relate to extensible object models for operational systems, and specifically, in some examples, to querying extensible object models representing operational systems.

BACKGROUND

Applicant has identified example technical challenges and difficulties associated with current solutions for querying extensible object models representing operational systems. Through applied effort, ingenuity, and innovation, Applicant has solved problems relating to querying extensible object models representing operational systems.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least present a search selection interface configured to receive search selection input indicating a selected search object of one or more search objects stored in a search object database associated with one or more extensible object models representing one or more operational systems. Each search object of the one or more search objects defines a type of search operation to be performed with respect to the one or more extensible object models. The at least one non-transitory memory and the program code are configured to, with the at least one processor, further cause the apparatus to at least receive, via the search selection interface, search selection input associated with a particular extensible object model of the one or more extensible object models, retrieve from the search object database the selected search object indicated by the received search selection input, generate an executable search query representing a particular instance of the type of search operation defined by the selected search object retrieved from the search object database based at least in part on the selected search object, submit the executable search query for execution against the particular extensible object model, receive object model data comprising a portion of the particular extensible object model and resulting from the execution of the executable search query against the particular extensible object model, generate search results data based at least in part on the received object model data, and present a results interface for displaying the search results data.

In some embodiments, each search object of the one or more search objects comprises a user-configurable display name.

In some embodiments, at least one search object of the one or more search objects comprises one or more required parameters required by the type of search operation defined by the at least one search object, the search selection interface is configured to receive parameter selection input with respect to the at least one search object and the particular extensible object model, the parameter selection input indicating a selection of one or more values corresponding to the one or more required parameters, and the executable search query is generated based at least in part on the received parameter selection input.

In some embodiments, the search selection interface is configured to receive text search input of the search selection input, the text search input representing text search terms for searching from among the one or more search objects based at least in part on user-configurable text data associated with each of the one or more search objects.

In some embodiments, the search selection interface may be configured to receive the search selection input specifically with respect to a subset of the one or more search objects that is associated with the particular extensible object model and/or a current user.

In some embodiments, the at least one non-transitory memory and the program code are configured to, with the at least one processor, further cause the apparatus to at least: present a search configuration interface configured to receive search configuration input for creating new search objects to add to the one or more search objects or for modifying existing search objects of the one or more search objects; receive, via the search configuration interface, the search configuration input; and generate or modify a search object of the one or more search objects based at least in part on the received search configuration input. The search configuration interface may comprise at least one interactable element for receiving a user-configurable display name, of the search configuration input, to be assigned to a search object of the one or more search objects.

In some embodiments, the at least one non-transitory memory and the program code are configured to, with the at least one processor, further cause the apparatus to at least, in response to detecting a change to a modified extensible object model of the one or more extensible object models, update at least one search object, of the one or more search objects, associated with the modified extensible object model based at least in part on the detected change.

In some embodiments, at least one search object of the one or more search objects is associated with version data indicating one or more versions of each of the one or more extensible object models with which the at least one search object is compatible, and the search selection interface is presented based at least in part on the version data.

In some embodiments, the executable search query is defined in a query language associated with a graph database in which the one or more extensible object models are stored, and the one or more search objects stored in the search object database are defined in a file or data interchange format.

According to another aspect, embodiments of the present invention feature a method comprising presenting a search selection interface configured to receive search selection input indicating a selected search object of one or more search objects stored in a search object database associated with one or more extensible object models representing one or more operational systems. Each search object of the one or more search objects defines a type of search operation to be performed with respect to the one or more extensible object models. The method further comprises receiving, via the search selection interface, search selection input associated with a particular extensible object model of the one or more extensible object models, retrieving from the search object database the selected search object indicated by the received search selection input, generating an executable search query representing a particular instance of the type of search operation defined by the selected search object retrieved from the search object database based at least in part on the selected search object, submitting the executable search query for execution against the particular extensible object model, receiving object model data comprising a portion of the particular extensible object model and resulting from the execution of the executable search query against the particular extensible object model, generating search results data based at least in part on the received object model data, and presenting a results interface for displaying the search results data.

According to another aspect, embodiments of the present invention feature a computer program product comprising at least one non-transitory computer-readable storage medium having computer-readable program code portions stored therein. The computer-readable program code portions comprise an executable portion configured to: present a search selection interface configured to receive search selection input indicating a selected search object of one or more search objects stored in a search object database associated with one or more extensible object models representing one or more operational systems. Each search object of the one or more search objects defines a type of search operation to be performed with respect to the one or more extensible object models. The computer-readable program code portions comprise an executable portion further configured to: receive, via the search selection interface, search selection input associated with a particular extensible object model of the one or more extensible object models, retrieve from the search object database the selected search object indicated by the received search selection input, generate an executable search query representing a particular instance of the type of search operation defined by the selected search object retrieved from the search object database based at least in part on the selected search object, submit the executable search query for execution against the particular extensible object model, receive object model data comprising a portion of the particular extensible object model and resulting from the execution of the executable search query against the particular extensible object model, generate search results data based at least in part on the received object model data, and present a results interface for displaying the search results data.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
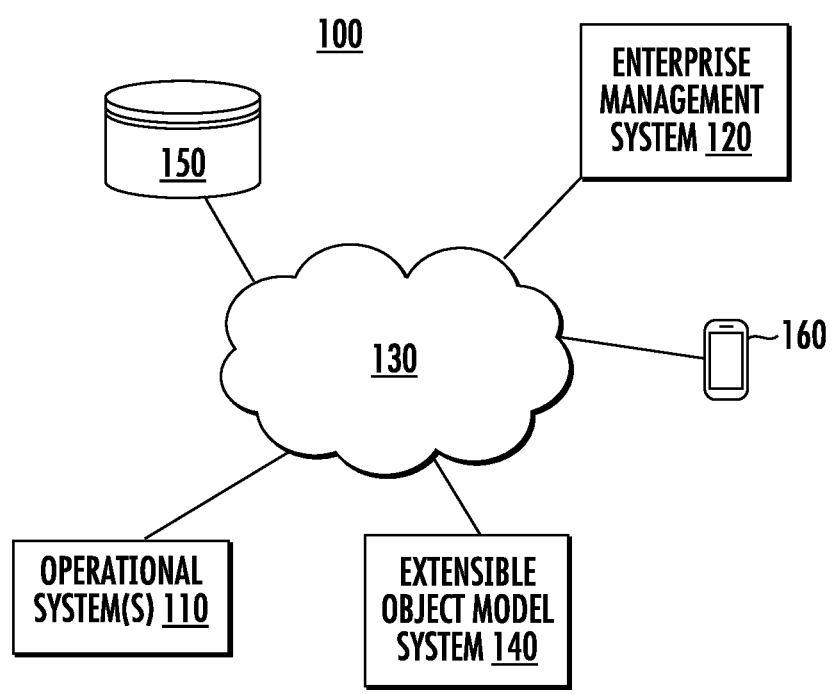
Figure 2:
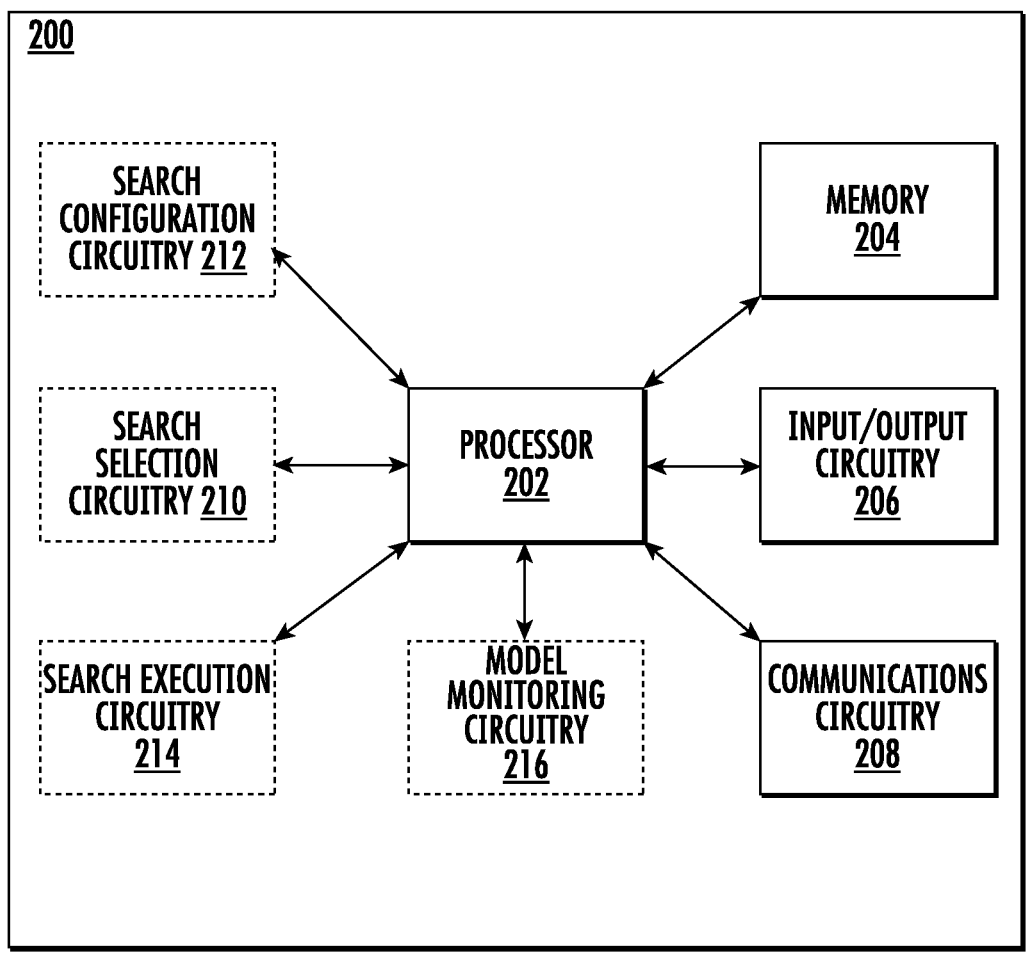
Figure 3:
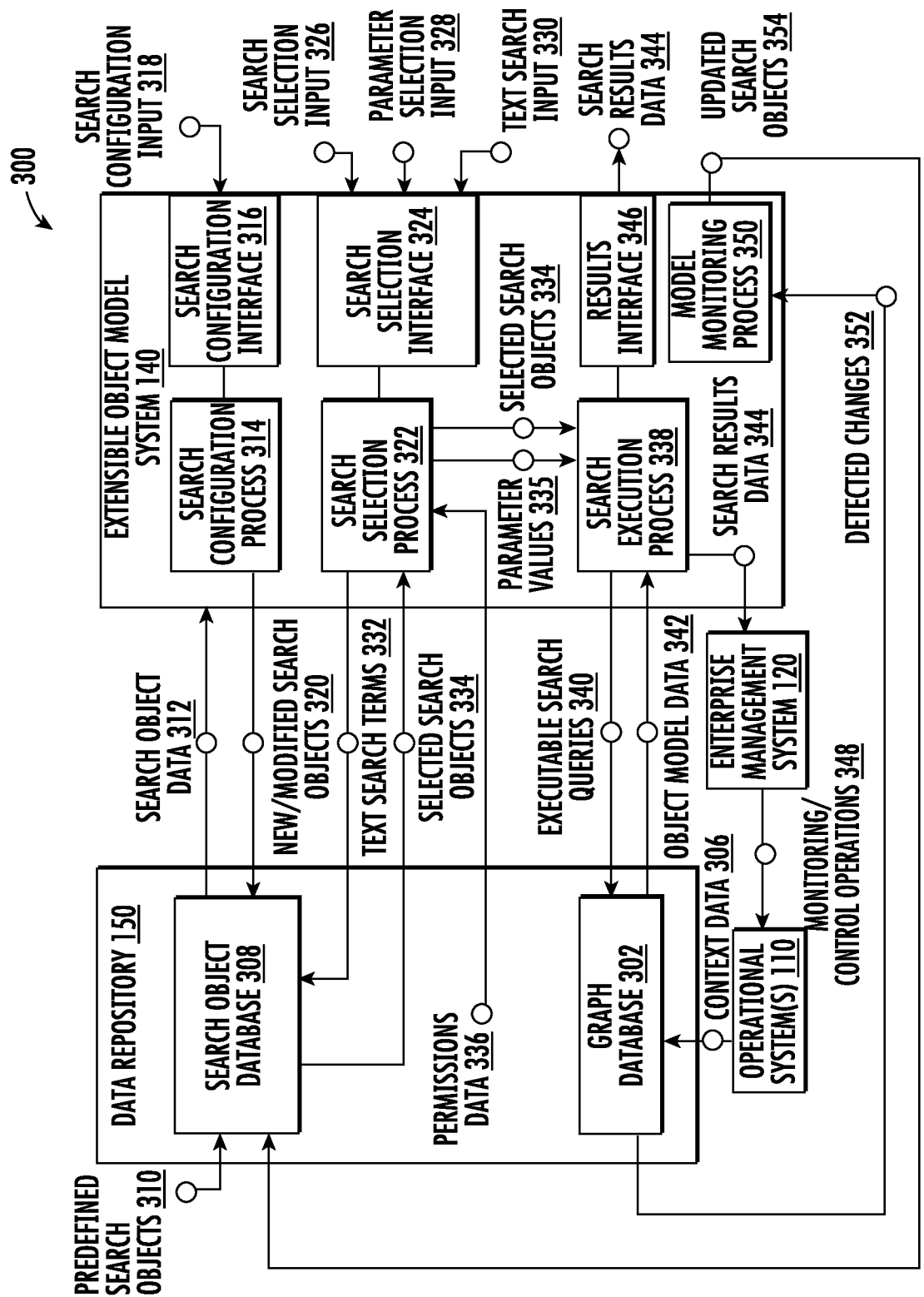
Figure 4:
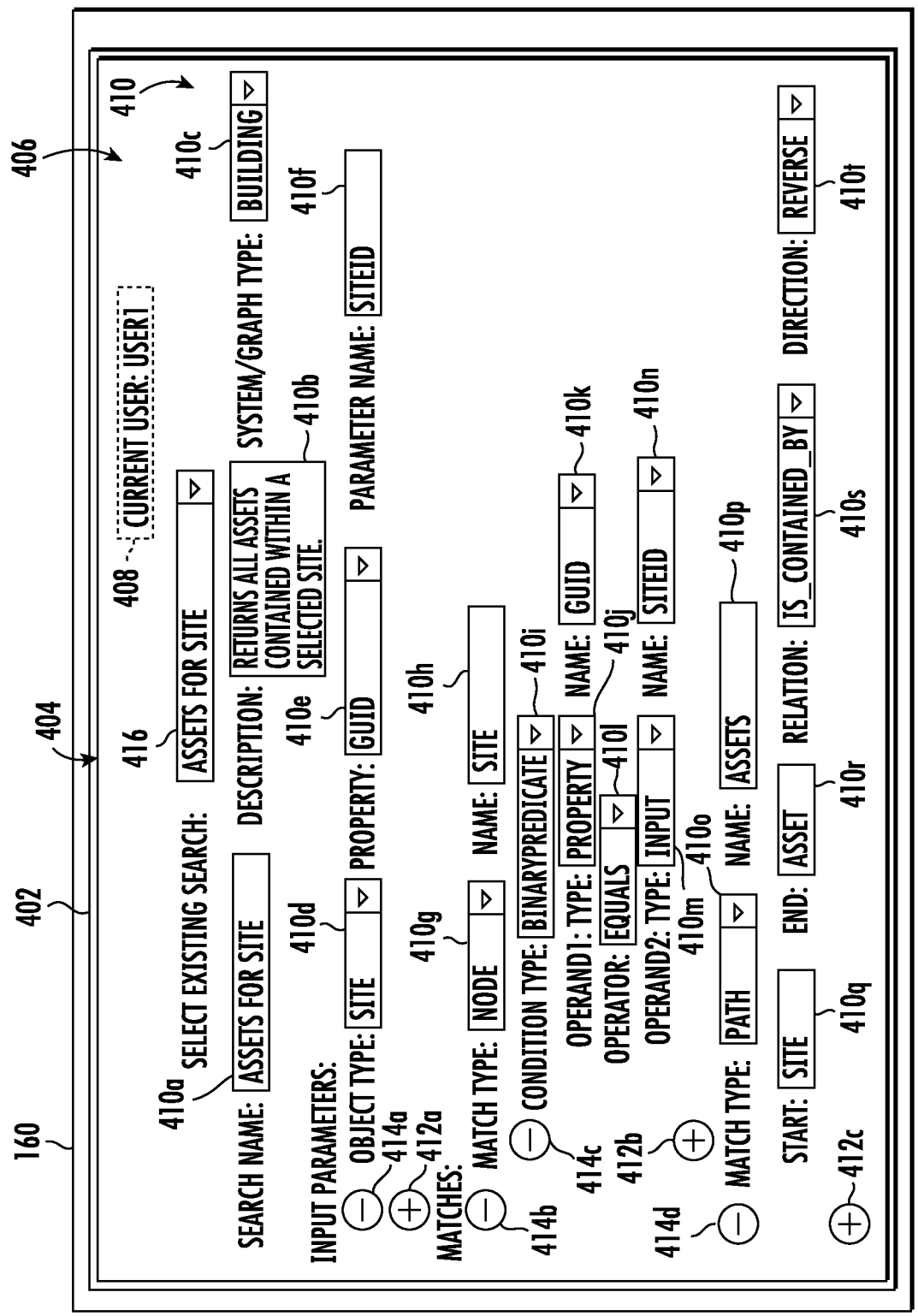
Figure 5:
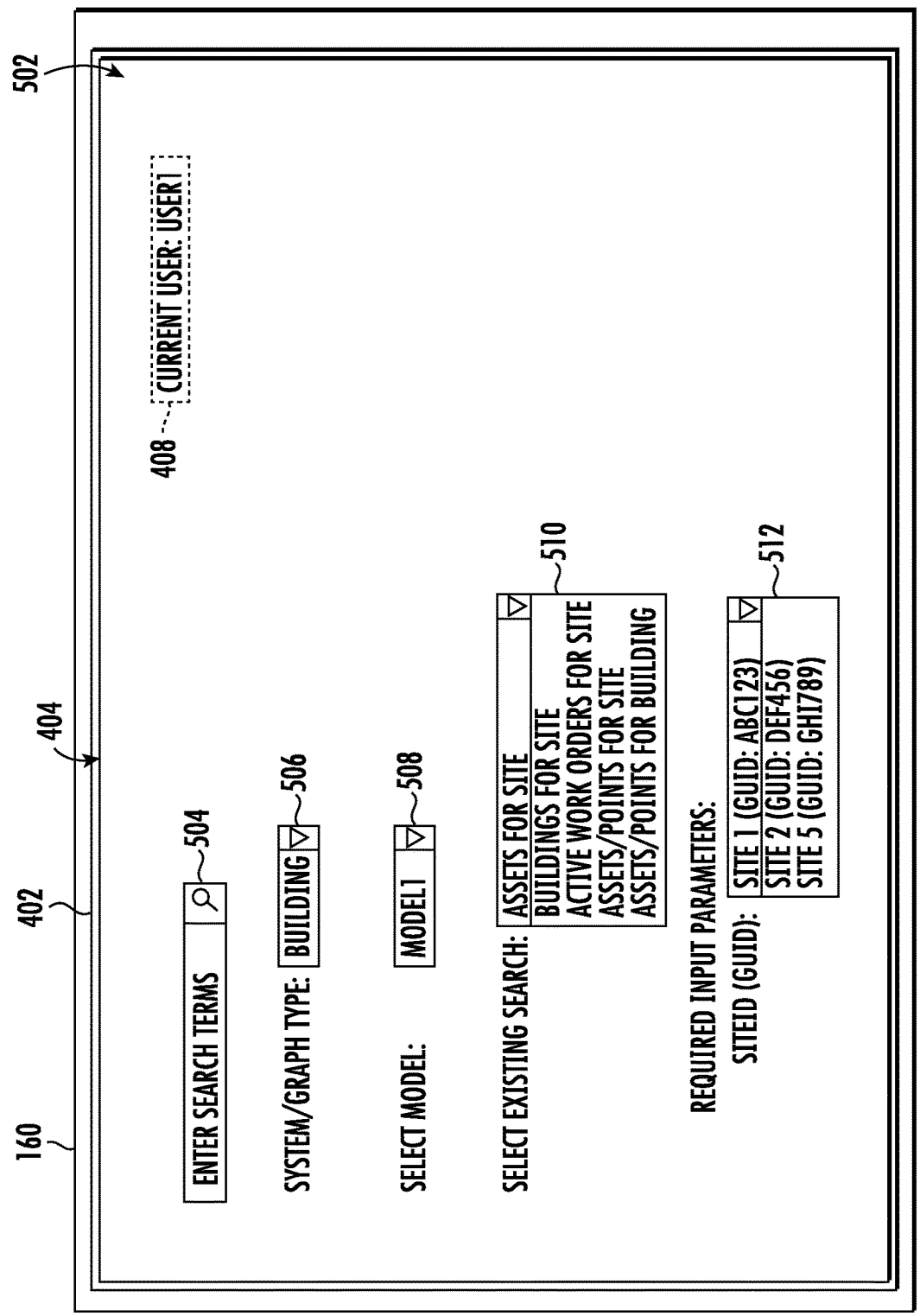
Figure 6:
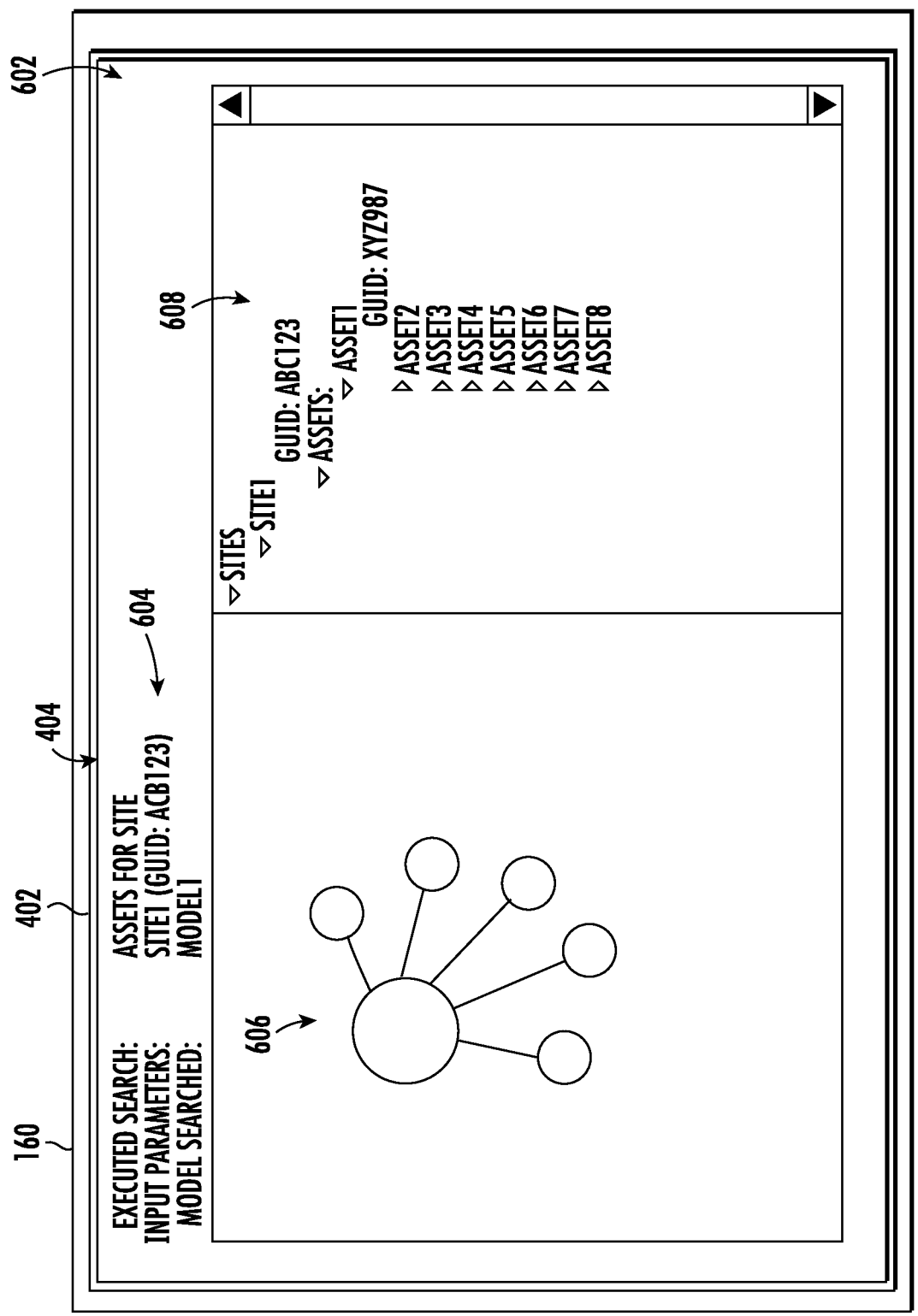
Figure 7:
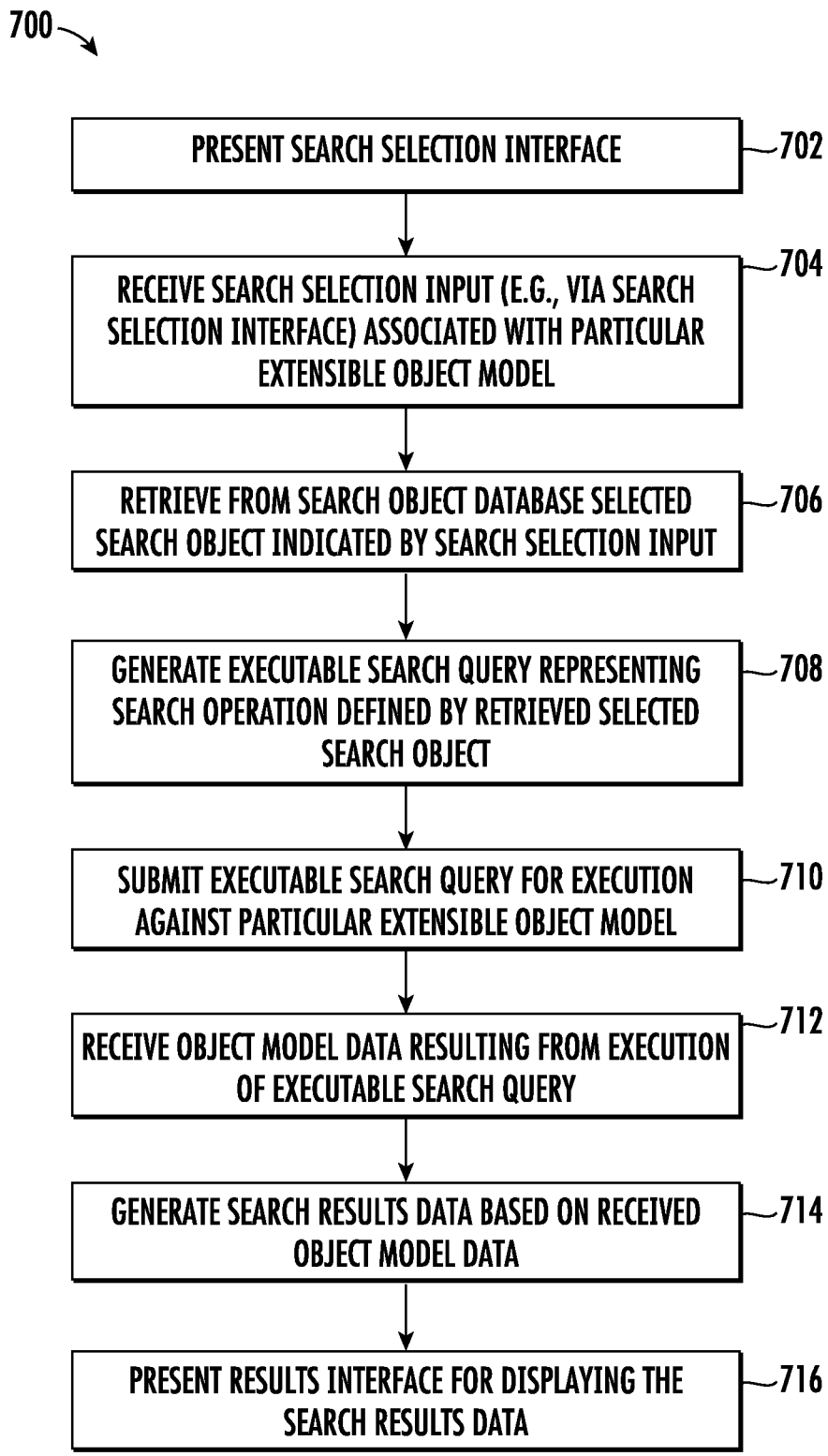
Figure 8:
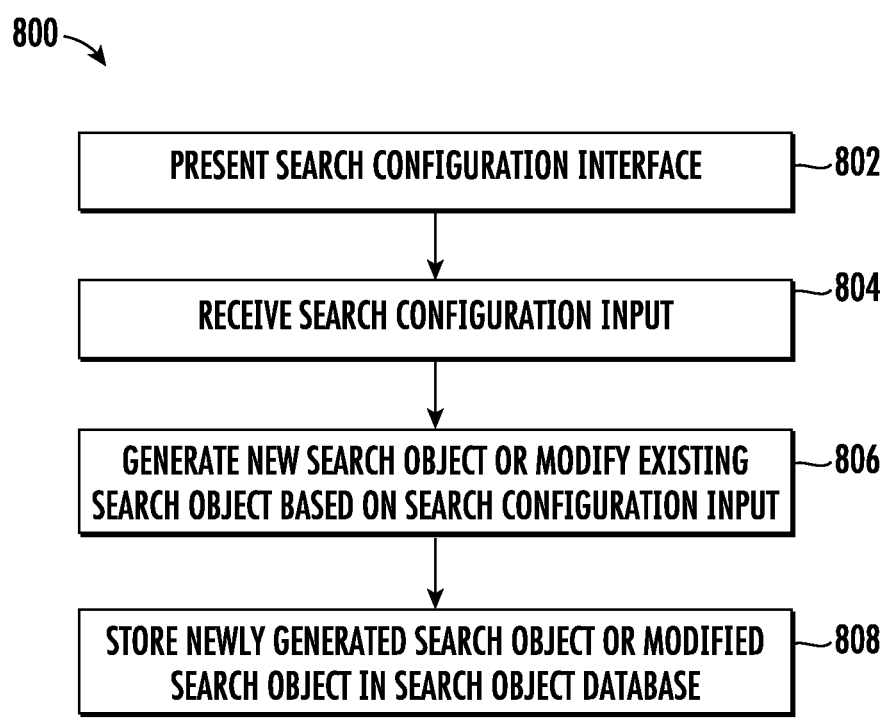
Figure 9:
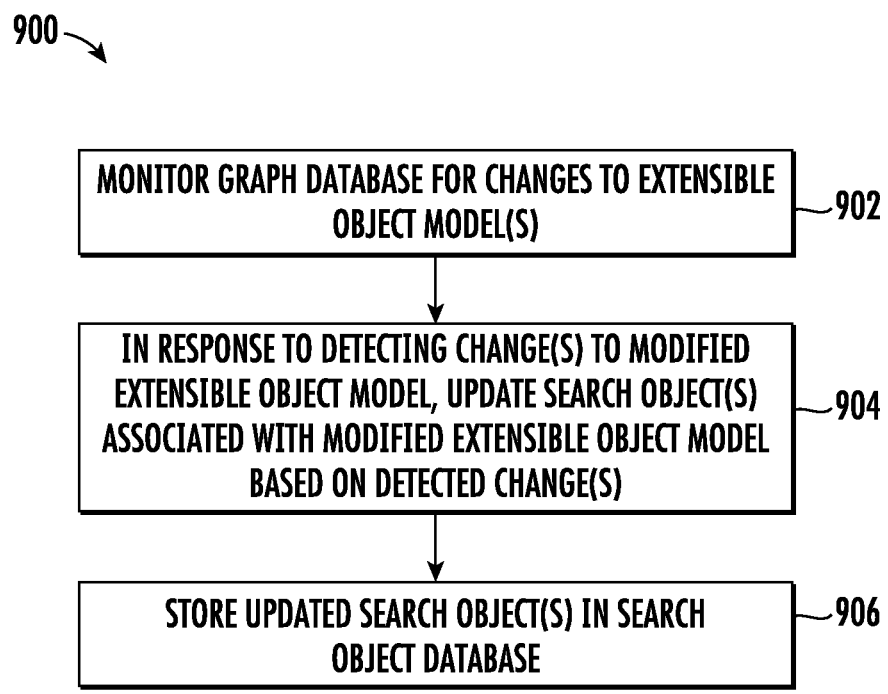

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary extensible object model system, in accordance with at least some example embodiments of the present disclosure;

FIG. 4 illustrates an exemplary search configuration screen presented within a graphical user interface, in accordance with at least some example embodiments of the present disclosure;

FIG. 5 illustrates an exemplary search selection screen presented within a graphical user interface, in accordance with at least some example embodiments of the present disclosure;

FIG. 6 illustrates an exemplary results screen presented within a graphical user interface, in accordance with at least some example embodiments of the present disclosure;

FIG. 7 is a flowchart depicting an example process for selecting and executing a search object, in accordance with at least some example embodiments of the present disclosure;

FIG. 8 is a flowchart depicting an example process for configuring search objects, in accordance with at least some example embodiments of the present disclosure; and FIG. 9 is a flowchart depicting an example process for updating search objects based on changes to extensible object models, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Operational systems such as building systems (e.g., heating, ventilation, and air conditioning (HVAC) systems, building automation systems, security systems) and/or industrial systems (e.g., manufacturing systems, sorting and distribution systems) are configured, in some examples, to monitor and/or control various physical aspects of a premises, building, site, location, environment, mechanical system, industrial plant or process, laboratory, manufacturing plant or process, vehicle, utility plant or process, and/or the like. An operational system comprises various assets, including, in some examples, equipment (e.g., controllers, sensors, actuators) configured to perform the functionality attributed to the operational system and/or components, devices, and/or subsystems of the operational system. In some examples, the operational system, via its various assets, may monitor and/or control operation of a residential or commercial building or premises (e.g., HVAC systems, security systems, building automation systems, and/or the like). In other examples, the operational system may monitor and/or control operation of a manufacturing plant (e.g., manufacturing machinery, conveyor belts, and/or the like). In yet other examples, the operational system may monitor and/or control operation of a vehicle.

Often, a given enterprise may be responsible for the management of several operational systems, across several sites and locations, each comprising several (e.g., possibly thousands) of assets. Management of such systems often includes monitoring conditions and/or performance of the systems' assets, facilitating and/or performing service on or physical maintenance of the assets, and/or controlling the assets in order to optimize the assets' and systems' performance and/or fulfill other objectives of the enterprise.

Enterprise performance management (EPM) systems have been proposed to monitor and maintain operational systems. For example, in some operational systems, it has been proposed to communicatively connect operational system(s), including assets of the operational system(s), to a remote monitoring system (e.g., a cloud platform) configured to aggregate operational data with respect to some or all of the assets of one or more operational systems (e.g., deployed at one or more sites or locations). This operational data may comprise sensor data (e.g., generated via assets such as sensors of the operational system) or any other data generated with respect to and/or describing operation of the operational systems and/or assets thereof. The monitoring system may also aggregate and/or maintain operational system context data defining various attributes (e.g., relationships, types, locations, roles) associated with the assets of the operational system and other objects associated with the operational system. This operational data and operational system context data may be collected, archived, and consulted in order to provide visibility into and perform various control operations with respect to the operational system(s), for example. These monitoring systems may be configured to provide, for each enterprise, an enterprise-wide, top-to-bottom, historical and/or real-time, view of the status of various processes, assets, people, and/or other objects associated with all of the operational system(s) managed by the enterprise. The monitoring systems may be configured to generate and present insights (e.g., predictions and/or recommendations) for optimizing performance of the operational system(s) and assets thereof. These insights are often generated using machine learning models, which may be developed, configured, and/or trained using one or more machine learning algorithms.

It has been proposed for some of these EPM systems to utilize graph database technology in order to represent operational systems and any objects related to such systems. A graph database uses graph structures, including data objects forming nodes and edges, each node representing an object relevant to an operational system and each edge defining a relationship between a pair of nodes. In such structures, properties may be defined for nodes and/or edges.

More particularly, operational system context data maintained by an EPM system may comprise an extensible object model and/or an extensible graph-based object model associated with each of the operational system(s). This extensible object model may comprise knowledge graphs that model assets and/or processes of and/or associated with the operational system(s). In one example, knowledge graphs of the operational system context data may define a collection of nodes and links that describe or represent real-world connections between the operational system(s) and/or assets thereof. A knowledge graph of the operational system context data may describe real-world entities (e.g., assets) and their interrelations organized in a graphical interface, may define possible classes and relations of entities or objects associated with the operational system(s) in a schema, may enable interrelating arbitrary entities or objects with each other, and/or may cover various topical domains associated with the operational system(s). Knowledge graphs of the operational system context data may define large networks of entities (e.g., assets), semantic types of the entities, properties of the entities, and relationships between the entities. The knowledge graphs of the operational system context data may describe a network of objects that are relevant to a specific domain or to an enterprise. The extensible object models are not limited to abstract concepts and relation but can also contain instances of objects, such as, for example, documents and datasets. In some embodiments, the knowledge graphs of the operational system context data may include resource description framework (RDF) graphs. As used herein, a "RDF graph" is a graph data model that formally describes the semantics, or meaning, of information. The RDF graph also represents metadata (e.g., data that describes data). According to various embodiments, extensible object models may also include a semantic object model, which may be a subset of a knowledge graph that defines semantics for the extensible object models. For example, a semantic object model may define a schema for an extensible object model.

One advantage provided by the use of extensible object models to represent operational systems is the ability to extend any aspect of a given model by simply adding new nodes representing new objects and/or new edges representing new relationships between the various objects. For example, a different type of extensible object model can be defined for each of a series of different types of operational systems, with each model type comprising a generic set of predefined, classes, objects, nodes, edges, and/or relationships. At the same time, each of these different types can be built upon and extended in different ways with respect to particular operational systems and/or particular enterprises to suit the different needs associated with the particular systems and/or enterprises.

One challenge involving the use of extensible object models to represent operational systems is that these object models are often large and complex, and queries for data from the extensible object model that would be useful in the context of managing operational systems also tend to be complex. Such queries are difficult for typical users to construct. An EPM system serving different entities (e.g., different enterprises) that each manage their own operational systems and maintain their own distinct extensible object models may have to perform certain operations in duplicate with respect to the different entities, as each entity invents their own queries in parallel and/or reinvents queries that have already been developed elsewhere.

Examples of the present disclosure concern an extensible object model system that provides saved searches that are re-usable across different extensible object models for different operational systems and/or different enterprises. In one example, the extensible object model system presents or exposes one or more interfaces enabling configuration, selection, entering of required parameters, and execution of saved searches as well as presentation of results of such execution, for example, as a graph and/or as nested records. These saved searches may be defined such that details of underlying graph models are abstracted away and may be stored in a database for future retrieval, translation to an executable format, and execution with respect to particular object models. The extensible object model system may provide additional security features via the saved searches, including, for example, associating saved searches with permissions data and only enabling access by a current user to the saved searches that they are permitted to access in the permissions data. In addition to providing a set of predefined saved searches to all entities served by the extensible object model system, the system may allow development, configuration, and customization of saved searches by particular entities specifically with respect to the extensible object models maintained by those particular entities.

FIG. 1 illustrates an exemplary block diagram of an environment 100 in which embodiments of the present disclosure may operate. Specifically, FIG. 1 illustrates one or more operational systems 110, an extensible object model system 140, an enterprise management system 120, one or more data repositories 150, and one or more user devices 160, all connected to a network 130.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 store operational data collected from and/or associated with the one or more operational systems 110, operational system context data associated with the one or more operational systems 110, including possibly one or more extensible object models (e.g., each representing one of the one or more operational systems 110), one or more predefined and/or user-configured search objects (e.g., stored in a search object database) associated with the extensible object model(s) and each defining a type of search operation to be performed with respect to the extensible object model(s), and/or permissions data associated with the search objects and/or the extensible object model(s), to list a few examples.

The one or more user devices 160 may be associated with users of the enterprise management system 120, the extensible object model system 140, and/or the operational system(s) 110. In various embodiments, the enterprise management system 120 may cause data associated with the one or more operational systems 110 (e.g., including operational data collected from and/or associated with the operational systems 110, data generated via the extensible object model system 140, and/or some or all of the model data forming the one or more extensible object models) to be transmitted to and/or displayed on the user device(s) 160. The extensible object model system 140 may cause data and/or interfaces associated with configuration, maintenance, selection, search, and/or utilization of the extensible object model(s) and/or search objects to be transmitted to and/or displayed on the user device(s) 160.

Each of the one or more operational systems 110 may be configured to monitor and/or control various physical aspects of a premises, building, site, location, environment, mechanical system, industrial plant or process, laboratory, manufacturing plant or process, vehicle, and/or utility plant or process, to name a few examples, via one or more assets of the one or more operational systems 110. The assets may be physical components (e.g., implemented at least via hardware) installed, positioned, and/or deployed throughout the operational system(s) 110, including controllers, sensors, and/or actuators of various types, to list a few examples. The assets may include computing devices for executing instructions (e.g., stored in nonvolatile memory) for performing various functions of the operational system(s) 110, for example, by receiving sensor data from one or more sensors and controlling one or more actuators (e.g., based on the received sensor data). The assets may include field controllers of the operational system. In an example context, at least some of the assets of the operational system(s) 110 may each embody a computing device of one or more systems for operation of a residential building (e.g., HVAC (heating, ventilation, and air conditioning) assets, security assets, and/or the like) such as controllers for directing the functionality of actuators such as air handlers, blowers, condensers, chillers, and/or dampers, to list a few examples. In another example context, at least some of the assets of the operational system(s) 110 may each embody a computing device of one or more systems for operation of a manufacturing plant (e.g., HVAC assets, manufacturing machinery, conveyor belts, and/or the like) such as controllers for directing the functionality of actuators such as the manufacturing machinery and/or conveyor belts. Actuators of the one or more operational systems 110 may be activated and/or controlled to perform various physical operations of the operational system 110.

Sensors of the one or more operational system 110 may be configured to generate sensor data based on incorporated sensing elements and may include digital sensors, which generate and transmit digital sensor data based on conditions sensed by sensing elements of the sensors, and/or analog sensors, which produce analog signals based on conditions sensed by sensing elements of the sensors. The sensors may be configured to read and/or otherwise capture certain values associated with a premises, building, site, location, environment, mechanical system, industrial plant or process, laboratory, manufacturing plant or process, and/or utility plant or process, or operations associated therewith or therein.

During configuration, operation, and/or maintenance of the one or more operational systems 110, operational data associated with the one or more operational systems 110 may be generated. In one example, during periods of operation of the operational system(s) 110, assets of the operational system(s) 110 may generate operational data based on and/or indicative of said operation, including sensor data, operational status data, operating conditions data, and/or operation logs (e.g., indicating operations performed by the system or assets thereof), to list a few examples. In another example, during configuration of the operational system(s), assets of the operational system(s) 110 may generate and/or receive system and/or asset configuration data of the operational data. In yet another example, other types of operational data may be generated (e.g., by the operational system(s) and/or external systems for managing the operational system(s) and/or an enterprise associated therewith), including operational system maintenance data based on and/or indicative of maintenance and/or service operations performed with respect to the operational system(s) 110 and/or operational system performance data based on and/or indicative of performance of the operational system(s) 110 with respect to one or more objectives of the enterprise.

Additionally or alternatively, operational system context data may be generated with respect to the one or more operational systems 110, including the one or more extensible object models. In one example, the enterprise management system 120 may be configured to manage and/or maintain the one or more operational systems 110, including receiving, retrieving, and/or aggregating data associated with the operational systems(s) 110 and generating the operational system context data and/or the extensible object model(s) based on the received, retrieved, and/or aggregated data.

In some examples, the operational system context data associated with an operational system 110 may comprise an extensible object model associated with the operational system 110, as previously defined. The operational system context data and/or extensible object model associated with a given operational system may comprise metadata associated with various components and/or assets of the given operational system, for example, defining various attributes and/or characteristics of the assets and/or associations or relationships between the various assets. In one example, the operational system context data and/or extensible object model for an operational system may comprise an ontology model providing a representation of each of the various assets of the operational system, classification of the assets into various groups or categories, definition of various attributes of the assets and/or categories, and/or definition of associations between the various objects and/or categories referenced throughout the operational system context data.

The operational system context data and/or extensible object model(s) may include identification information for individual assets of the operational system, type information for the individual assets assigning types to each of the assets, properties associated with the identification information and/or the type information, locations of the assets within the operational system and/or an environment where the operational system is installed, functional and/or physical locations of the assets with respect to each other, relationships between the assets with respect to each other, relationships between types of the assets with respect to each other, and/or roles of the assets and/or types of assets within the operational system and/or within subsystems of the operational system, to name a few examples. The operational system context data and/or extensible object model(s) associated with a given operational system may comprise data and/or metadata associated with any objects associated with the given operational system, which objects may include assets and/or equipment of the one or more operational systems 110, sensors included in and/or associated with the one or more operational systems 110, alarms or alarm tasks associated with the one or more operational systems 110 (e.g., concerning required or recommended maintenance, anomalies, unsafe operating conditions), sites, locations, or regions containing the one or more operational systems 110 and/or any assets thereof, and/or individuals associated with the one or more operational systems 110, to name a few examples.

The operational system context data and/or extensible object model associated with a given operational system may comprise data and/or metadata defining objects representing management, maintenance, and/or service tasks associated with various assets of the operational systems, including, for example, alarms associated with certain assets or types of assets and representing configuration settings for generating alarm notifications concerning the need for certain maintenance operations associated with the assets or asset types.

The operational data and/or operational system context data (e.g., including the one or more extensible object models) associated with the one or more operational systems 110 may be aggregated and/or stored in the one or more data repositories 150 and/or may be accessible by the extensible object model system 140 and/or the enterprise management system 120.

The extensible object model system 140 may be a computing system or device (e.g., server system) configured via hardware, software, firmware, and/or a combination thereof, to generate, configure, modify, access, utilize, and/or manage the one or more extensible object models associated with the one or more operational systems 110.

More particularly, the extensible object model system 140 may be configured to present and/or expose one or more model transaction interfaces, receive (e.g., via the model transaction interface(s)) and process model transactions generated by the enterprise management system 120 in connection with the extensible object model(s), to generate, configure, modify, commit changes to, and/or retrieve model data from the extensible object model(s) (e.g., based on the received and processed model transactions), and/or to transmit model data from the extensible object model(s) to the enterprise management system 120.

In some embodiments, the extensible object model system 140 may be configured to present a search configuration interface for receiving search configuration input for creating new search objects or for modifying existing search objects, receive (e.g., via the search configuration interface) the search configuration input, and generate or modify a search object based at least in part on the received search configuration input.

In some embodiments, the extensible object model system 140 may be configured to present a search selection interface for receiving search selection input indicating a selected search object (e.g., stored in the search object database and/or the one or more data repositories 150), receive (e.g., via the search selection interface) the search selection input associated with a particular extensible object model, retrieve (e.g., from the search object database) the selected search objected indicated by the received search selection input, generate an executable search query representing a particular instance of the type of search operation defined by the selected search object (based at least in part on the selected search object), submit the executable search query for execution against the particular extensible object model, receive object model data (e.g., comprising a portion of the particular extensible object model) resulting from the execution of the executable search query, generate search results data based at least in part on the received object model data, and/or present a results interface for displaying the search results data. Additionally, the extensible object model system 140 may be configured to receive (e.g., via the search selection interface) parameter selection input (e.g., indicative of one or more required parameters required by and/or associated with a selected search object) and generate the executable search query based at least in part on the received parameter selection input. Additionally or alternatively, the extensible object model system 140 may be configured to receive (e.g., via the search selection interface) text search input representing one or more text search terms for searching from among the search objects based at least in part on (e.g., user-configurable) text data associated with one or more of the search objects. Additionally or alternatively, the extensible object model system 140 may be configured to determine a current context (e.g., current user, particular extensible object model selected for a search) and/or to receive the search selection input specifically with respect to the current context.

In some embodiments, the extensible object model system 140 may be configured to monitor for and/or detect one or more changes to the extensible object model(s) representing the operational system(s) and, in response to detecting a change to a modified extensible object model, to update at least one of the search objects associated with the modified extensible object model based at least in part on the detected change(s).

The enterprise management system 120 may be or comprise an EPM system (as previously defined and described) and/or a computing system or device (e.g., server system) configured via hardware, software, firmware, and/or a combination thereof, to perform various operations with respect to the operational system(s) 110 and/or the extensible object model(s). For example, the enterprise management system 120 may be configured to (e.g., in conjunction with the user device(s) 160 and/or the search configuration interface, search selection interface, and/or results interface generated and presented by the extensible object model system 140) receive and/or generate the search configuration input, search selection input, parameter selection input and/or to present the search results data generated by the extensible object model system 140. In another example, the enterprise management system 120 may be configured to perform one or more monitoring and control operations with respect to the operational system(s) 110 based at least in part on the search results data generated by the extensible object model system 140.

In some embodiments, the enterprise management system 120 may be configured to present and/or process any output data resulting from operations performed by the extensible object model system 140 and/or the operational system(s) 110, including, for example, presenting one or more monitoring, control, and/or insight interfaces within a graphical user interface (GUI) rendered on one or more displays of one or more of the user devices 160. The one or more interfaces may comprise one or more graphical elements for displaying the output data (e.g., including data resulting from processing the output data) and/or one or more interactable elements for receiving presentation and/or analysis input, for example, as user input. The presentation and/or analysis input may represent one or more selections of presentation parameters for determining how the output data is displayed and/or one or more selections of analysis parameters for determining how the output data is processed, to name a few examples. The output data presented and/or processed by the enterprise management system 120 may include model data from the extensible object model(s) (e.g., representing some or all of a given extensible object model), and/or search results data, to list a few examples.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of one or more operational systems 110, an extensible object model system 140, an enterprise management system 120, data repositories 150, and/or user devices 160. The apparatus 200 includes processor 202, memory 204, input/output circuitry 206, communications circuitry 208, and/or search selection circuitry 210, search configuration circuitry 212, search execution circuitry 214, and/or model monitoring circuitry 216. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of one or more components of one or more operational systems 110, an extensible object model system 140, an enterprise management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Search configuration circuitry 212 may be included in the apparatus 200 (e.g., an apparatus specifically corresponding to the extensible object model system 140). The search configuration circuitry 212 may include hardware, software, firmware, and/or a combination thereof, designed and/or configured to request, receive, process, generate, and transmit data, data structures, control signals, and electronic information for configuring, generating, storing, and/or modifying search objects, including performing any of the operations described herein with respect to configuring, generating, storing, and/or modifying search objects.

Search selection circuitry 210 may be included in the apparatus 200 (e.g., an apparatus specifically corresponding to the extensible object model system 140). The search selection circuitry 212 may include hardware, software, firmware, and/or a combination thereof, designed and/or configured to request, receive, process, generate, and transmit data, data structures, control signals, and electronic information for searching and/or selecting search objects and/or receiving parameters associated with selected search objects, including performing any of the operations described herein with respect to searching and/or selecting search object and/or receiving parameters associated with selected search objects.

Search execution circuitry 214 may be included in the apparatus 200 (e.g., an apparatus specifically corresponding to the extensible object model system 140). The search execution circuitry 214 may include hardware, software, firmware, and/or a combination thereof, designed and/or configured to request, receive, process, generate, and transmit data, data structures, control signals, and electronic information for generating and/or executing executable search queries and/or generating search results data, including performing any of the operations described herein with respect to executable search queries and/or search results data.

Model monitoring circuitry 216 may be included in the apparatus 200 (e.g., an apparatus specifically corresponding to the extensible object model system 140). The model monitoring circuitry 216 may include hardware, software, firmware, and/or a combination thereof, designed and/or configured to request, receive, process, generate, and transmit data, data structures, control signals, and electronic information for detecting changes to extensible object models and/or generating updated search objects based on the detected changes, including performing any of the operations described herein with respect to detecting changes to extensible object models and/or generating updated search objects based on the detected changes.

In some embodiments, two or more of the sets of circuitries 202-216 are combinable. Alternatively, or additionally, one or more of the sets of circuitry 202-216 perform some or all of the operations and/or functionality described herein as being associated with another circuitry. In some embodiments, two or more of the sets of circuitry 202-216 are combined into a single module embodied in hardware, software, firmware, and/or a combination thereof. For example, in some embodiments, one or more of the sets of circuitry, for example the search selection circuitry 210, may be combined with the processor 202, such that the processor 202 performs one or more of the operations described herein with respect the search selection circuitry 210.

FIG. 3 is an illustration of an example extensible object model system 140, in accordance with at least some example embodiments of the present disclosure. Specifically, FIG. 3 includes schematic depictions of the example extensible object model system 140, including example internal processes and components of the extensible object model system 140, and/or schematic depictions of the one or more data repositories 150, the enterprise management system 120, and the operational system(s) 110 in communication with the extensible object model system 140, along with example data objects used by and/or produced by the depicted processes, components, and/or systems. The extensible object model system 140 and/or apparatuses 200 associated therewith, for example, may be specially configured via hardware, software, firmware, and/or a combination thereof, to perform the various data processing and interactions described with respect to FIG. 3 to configure, generate, store, modify, update, search, retrieve, use, and/or re-use search objects associated with extensible object model(s) representing operational system(s) 110.

In the illustrated example, the extensible object model system 140 comprises, in some examples, a search configuration process 314, a search configuration interface 316, a search selection process 322, a search selection interface 324, a search execution process 338, a results interface 346, and a model monitoring process 350. Additionally, the one or more data repositories 150 comprise, in some examples, a graph database 302 and a search object database 308.

As previously discussed, during configuration, operation, and/or maintenance of the operational system(s) 110, operational system context data 306 (embodied in and/or comprising, in some examples, the operational system context data as defined and described hereinabove, including with respect to FIG. 1) associated with the operational system(s) 110 may be generated and/or stored in the one or more data repositories 150. In particular, the operational system context data 306 may be generated, collected, aggregated, and/or stored in the graph database 302 at least in part in the form of one or more extensible object models, which may be embodied in and/or comprise the extensible object model(s) as previously defined hereinabove.

The graph database 302 may be a graph database as previously defined and described (e.g., structuring stored data as objects that form nodes and edges, each node representing an object of and/or associated with an operational system and each edge defining a relationship between a pair of nodes). The graph database 302 may be configured to store the extensible object model(s) associated with and/or representing the operational system(s) 110 and/or may be associated with the extensible object model system 140 and/or the enterprise management system 120. In one example, some or all of the graph database 302 may be embodied in one or more graph database products and/or services (e.g., cloud-based graph database platforms) such as the Neo4j Graph Database product(s) and/or Neo4j AuraDB service(s) produced by Neo4j, Inc.

Moreover, as previously discussed, the extensible object model system 140 may be configured to maintain the extensible object model(s) stored in the graph database 302, including generating, configuring, modifying, accessing, utilizing, and/or otherwise managing the extensible object model(s). The extensible object model system 140 may be configured to facilitate access by other devices and/or systems (e.g., the user devices 160 and/or enterprise management system 120) associated with the one or more operational systems 110 by performing or causing performance of search operations with respect to the extensible object model(s). In one example, these search operations may be based at least in part on search parameters that define aspects of a search operation such as which particular extensible object model should be searched, which particular data object(s) should be targeted or selected (e.g., data objects having properties and/or attributes matching certain items of the search parameters) and/or which particular properties of the targeted or selected data objects and/or particular types of data object(s) (or properties thereof) and/or relationships (or properties thereof) associated with the targeted or selected data objects should be included in the model data returned as the results of the search operation, to list a few examples. In response to execution of a search operation, the graph database 302 may be configured to return the matching data objects, any properties of the matching data objects, any data objects associated with the matching data objects, and/or any properties of the associated data objects, as defined in the search parameters for the search operation.

In some embodiments, the extensible object model system 140 may be configured to maintain the search object database 308 and/or store in the search object database 308 one or more search objects, each defining a type of search operation to be performed with respect to the extensible object model(s) stored in the graph database 302. The search object database 308 may be a document database, document-oriented database, or document store configured to store semi-structured data, which may be encapsulated and/or encoded in a predetermined standard format or encoding associated with the search object database 308 such as a file or data interchange format (e.g., JavaScript Object Notation (JSON)). Accordingly, the extensible object model system 140 and/or search object database 308 may be configured such that each of the search objects stored in the search object database 308 is a discrete object defined in the associated file or data interchange format (e.g., JSON).

In some embodiments, each of the search objects comprise one or more items of data identifying, characterizing, and/or defining the type of search operation and/or any instances thereof associated with the search object, including a search object identifier, a display name, text data characterizing and/or describing the type of search operation and/or any instances thereof, version data indicating a current version associated with the search object and/or a version history for the search object, model type data indicating one or more types of extensible object models with which the search object is associated with and/or compatible with, model version data indicating one or more versions of one or more extensible object models (or types thereof) with which the search object is associated, required input parameter data indicating one or more input parameters required to be received with respect to a particular extensible object model and/or execution of a particular instance of the search operation of the type of search operation defined by the search object against the particular extensible object model, and/or search definition data defining the type of search operation and/or any instances thereof associated with the search object in terms of one or more predefined attributes, one or more values and/or attributes provided upon initial configuration of the search object, and/or one or more variables representing the one or more required input parameters indicated by the required input parameter data, to list a few examples. The search objects may be formatted according to a predefined search object format (e.g., built upon and/or utilizing the file or data interchange format associated with the search object database 308, such as JSON) establishing how various characteristics of a type of search operation should be encoded, expressed, defined, and/or represented in a search object representing that type of search operation and/or establishing how these various characteristics encoded, expressed, defined, and/or represented in the search object representing that type of search operation should be translated to, for example, an executable search query representing a particular instance of that type of search operation.

In some embodiments, the search objects stored in the search object database may comprise one or more predefined search objects 310, which may be, for example, "out of the box" search objects configured and/or generated by an entity providing (e.g., via the extensible object model system 140) extensible object modelling functionality as a service to one or more enterprises or subscribers. For example, each of the predefined search objects 310 may be associated with a particular type of operational system 110 and/or type of extensible object model and may represent a typical, useful, expected, or commonly executed type of search operation specific to the particular type of operational system 110 and/or extensible object model associated with the predefined search object 310.

Additionally, in some embodiments, one or more of the search objects stored in the search object database 308 may be user-configured search objects, which may be, for example, customized search objects configured and/or generated based at least in part on configuration input received by the extensible object model system 140 (e.g., via the enterprise management system 120 and/or user device(s) 160). The user-configured search objects may be associated with a particular type of operational system 110 and/or type of extensible object model, which particular type may be common across a plurality of different enterprises or subscribers or may be specific to a particular enterprise or subscriber with which the user-configured search object is associated and/or from which the configuration input is received. Moreover, in some cases, one or more of the search objects stored in the search object database 308 may be user-configured search objects that were generated based at least in part on a combination of a predefined search object 310 and configuration input (e.g., having an original state corresponding to that of one of the predefined search objects 310 and being further modified based on the configuration input).

In some embodiments, the extensible object model system 140 may be configured to retrieve search object data 312 from the search object database 308 identifying, characterizing, and/or comprising entirely or in part one or more of the search objects stored in the search object database 308. The extensible object model 140 may be configured to perform some or all of the functionality described herein with respect to search objects based at least in part on the search object data 312 retrieved from the search object database 308, including generating and/or presenting various interfaces, updating existing search objects, and/or updating search objects based on detected changes to the extensible object model(s), to list a few examples.

In various embodiments, the extensible object model system 140 may be configured to perform and/or facilitate configuration, generation, storage, and/or modification of one or more of the search objects stored in the search object database 308. More particularly, in some embodiments, the search configuration process 314 of the extensible object model system 140 may be configured to present the search configuration interface 316, which may be configured to receive search configuration input 318 (e.g., from and/or based on input received and/or detected by the enterprise management system 120 and/or user device(s) 160) associated with one or more search objects, including search objects to be created and/or existing search objects stored in the search object database 308. For example, the search configuration process 314 may be configured to present the search configuration interface 316 within a graphical user interface (GUI) rendered on one or more displays of one or more of the user devices 160, the search configuration interface 316 comprising one or more interactable elements configured to receive input or selections (of the search configuration input 318) indicative of various characteristics, aspects, properties, and/or parameters associated with a type of search operation represented by a search object. The search configuration process 314 may be configured to generate and/or present the search configuration interface 316 based at least in part on the search object data 312 retrieved from the search object database 308, including, in one example, presenting data (e.g., display names) associated with one or more search objects available for selection to be modified within the GUI and/or presenting current values of attributes of search objects indicated in the search object data 312 along with interactable elements for receiving modified or updated values with respect to those current values. Additionally or alternatively, the search configuration process 314 may be configured to present the search configuration interface 316 by exposing an application programming interface (API) configured to receive the search configuration input 318.

The search configuration input 318 received by the search configuration process 314 via the search configuration interface 316 may comprise data indicative of selected or input values corresponding to some or all of the items of data identifying, characterizing, and/or defining a type of search operation associated with a new or modified search object, including the display name, text data, version data, model type data, model version data, required input parameter data, and/or search definition data, to list a few examples.

In various embodiments, the search configuration process 314 may be configured to generate new and/or modified search objects 320 based at least in part on the search configuration input 318 and to store the new and/or modified search objects 320 in the search object database 308. For example, the search configuration process 314 may be configured to generate a new search object (of the new and/or modified search objects 320) in response to receiving search configuration input 318 with respect to a search object to be created based at least in part on the search configuration input 318 by populating a data object representing the new search object with the selected or input values indicated in the search configuration input 318 according to the predefined search object format and/or the file or data interchange format associated with the search object database 308 and storing the new search object in the search object database 308. In another example, the search configuration process 314 may be configured to generate a modified search object (of the new and/or modified search objects 320) in response to receiving search configuration input 318 with respect to an existing search object to be modified by overwriting current values of the existing search object with the corresponding selected or input values indicated in the search configuration input 318 and storing the modified search object (and/or selected or input values) in the search object database 308.

In various embodiments, the extensible object model system 140 may be configured to perform and/or facilitate searching and/or retrieving of one or more of the search objects stored in the search object database 308. More particularly, in some embodiments, the search selection process 322 of the extensible object model system 140 may be configured to present the search selection interface 324, which may be configured to receive search selection input 326, parameter selection input 328, and/or text search input 330 (e.g., from and/or based on input received and/or detected by the enterprise management system 120 and/or user device(s) 160) associated with one or more search objects, including existing search objects (stored in the search object database 308) to be searched among and/or selected. For example, the search selection process 322 may be configured to present the search selection interface 324 within a GUI rendered on one or more displays of one or more of the user devices 160, the search selection interface 324 comprising one or more interactable elements of the search selection interface 324 configured to receive input or selections indicative of various characteristics, parameters, and/or search terms associated with a particular instance of the type of search operation represented by a search object. The search selection process 322 may be configured to generate and/or present the search selection interface 324 based at least in part on the search object data 312 retrieved from the search object database 308, including, in one example, presenting within the GUI data (e.g., display names, text data, filtering parameters) associated with one or more search objects available for selection. Additionally or alternatively, the search selection process 322 may be configured to present the search selection interface 324 by exposing an API configured to receive the search selection input 326, parameter selection input 328, and/or text search input 330.

More particularly, in various embodiments, the search selection input 326 may comprise various items of data indicative of a selected search object and/or filtering parameters for updating the search selection interface 324 to display a filtered set of search objects available for selection (in order to facilitate selection of the selected search object). The search selection process 322 may be configured to retrieve from the search object database 308 the selected search object 334 indicated by the search selection input 326 in connection with executing a particular instance of the type of search operation represented by the selected search object 334.

In some embodiments, the text search input 330 may comprise various items of data indicative of text search terms 332 for searching from among the search objects stored in the search object database 308. For example, the search selection process 322 may be configured to extract the text search terms 332 from the text search input 330 and to transmit the text search terms 332 to the search object database 308 as part of a search operation performed with respect to the stored search objects and, more particularly, the text data associated with one or more of the stored search objects. The search selection process 322 may be configured to receive results from the search from among the stored search object (e.g., an instance of the search object data 312 corresponding to a set of search objects having text data determined to match the text search terms 332), update the search selection interface 324 to display the received results from the search from among the stored search objects along with one or more interactable elements configured to receive input indicative of a selection (e.g., as the selected search object 334) of one of the search objects indicated in the results of the search from among the stored search objects.

In some embodiments, the parameter selection input 328 may comprise various items of data indicative of one or more values corresponding to the one or more input parameters indicated as required by the required input parameter data of a selected search object 334 and/or corresponding to the one or more variables representing the one or more required input parameters as referenced in the search definition data of the selected search object 334. In one example, the search selection process 322 may be configured to determine and/or retrieve a selected search object 334 (e.g., based on the search selection input 326 and/or text search input 330) and, in response, to determine from the required input parameter data of the selected search object 334 retrieved from the search object database 308 any required input parameter(s). In response to determining that the required input parameter data of the selected search object 334 indicates that one or more required parameters are required by the type of search operation defined by the selected search object 334, the search selection process 322 may be configured to update the search selection interface 324 to display text data identifying the one or more required parameters along with one or more interactable elements configured to receive input (e.g., of the parameter selection input 328) indicative of one or more values corresponding to the one or more required parameters.

In various embodiments, the search selection process 322 may be configured to transmit or otherwise make available to the search execution process 338 the selected search objects 334 (indicated in the search selection input 326 and/or retrieved from the search object database 308) and/or any parameter values 335 (e.g., from the parameter selection input 328) corresponding to the required input parameters associated with the selected search objects 334.

In various embodiments, the extensible object model system 140 may be configured to perform and/or facilitate using and/or re-using of one or more of the search objects stored in the search object database 308. More particularly, in some embodiments, the search execution process 338 of the extensible object model system 140 may be configured to obtain or otherwise access the selected search object 334 and/or parameter values 335 from the search selection process 322 and to generate an executable search query 340 (based at least in part on the selected search object 334, any corresponding parameter values 335, and/or the predefined search object format associated with the search object database 308). In one example, the search execution process 338 may be configured to generate the executable search query 340 by translating or transforming the various items of data encoded, expressed, defined, and/or represented in the search definition data of the selected search object 334 into a query defined in a query language associated with the graph database 302 (e.g., Cypher) according to the predefined search object format associated with the search object database 308. This translation or transformation may comprise assigning to any variables (referenced in the search definition data of the selected search object 334) representing required input parameters for the selected search object 334 the corresponding parameter values 335 determined from the parameter selection input 328 such that the resulting executable search query 340 comprises the parameter values 335 at each point in the query corresponding to the respective variables referenced in the search definition data (in their translated or transformed form). Accordingly, the executable search query 340 generated by the search execution process 338 may represent a particular instance of the type of search operation defined by the selected search object 334.

In various embodiments, the search execution process 338 may be configured to submit the executable search query 340 for execution, or otherwise cause execution of the executable search query 340, against a particular extensible object model stored in the graph database 302. For example, the search execution process 338 may be configured to generate a model transaction comprising at least the executable search query 340 and to commit (or otherwise cause commitment of) the model transaction to the graph database 302 and/or the particular extensible object model stored therein, which may cause the graph database 302 to execute the particular instance of the search operation represented by the executable search query 340 by retrieving from the particular extensible object model the particular data object(s) and particular properties thereof, including any nodes or relationships selected or targeted via the search operation and/or any nodes or relationships associated with the selected or targeted nodes or relationships, as defined in the search parameters indicated in the search definition data of the selected search object 334 and/or the parameter values 335 and as translated and represented in the executable search query 340. The search execution process 338 may be configured to receive from the graph database 302 object model data 342 comprising a portion of the particular extensible object model based at least in part on the execution of the executable search query 340 (e.g., comprising the particular data object(s) and particular properties thereof retrieved from the particular extensible object model).

In various embodiments, the search execution process 338 may be configured to generate search results data 344 based at least in part on the object model data 342 received from the graph database 302. The search results data 344 may comprise at least the received object model data 342. In some embodiments, the search execution process 338 may be configured to reformat and/or restructure the received object model data 342 according to a predefined search results format associated with the extensible object model system 140 and to generate the search results data 344 to comprise the reformatted and/or restructured object model data 342, the predefined search results format being configured for optimal presentation, analysis, and/or processing of the search results data 344 (e.g., by processes executing on and/or associated with the enterprise management system 120 and/or the user devices 160). Additionally or alternatively, the search results data 344 may comprise data in addition to the object model data 342, such as data associated with, comprising, and/or derived from the selected search object 334 and/or corresponding parameter values 335, data indicative of, derived from, and/or associated with a monitoring and control context within which the search operation was performed, and/or display data generated by the search execution process 338 and defining various aspects of how the search results data 344 is displayed and/or presented.

In some embodiments, the search execution process 338 may be configured to present the results interface 346, which may be configured to display the search results data 344. For example, the search execution process 338 may be configured to present the results interface 346 within a GUI rendered on one or more displays of one or more of the user devices 160, the results interface 346 comprising one or more panes in which one or more graphical elements representing various items of the search results data 344 are rendered in one or more formats, including a graph format representing nodes and/or relationships indicated in the search results data 344 as shapes in a visual arrangement corresponding to the structure of the extensible object model(s) and/or the portion thereof included in the search results data 344, and/or a nested record format representing nodes and/or relationships indicated in the search results data 344 as items of textual data in a nested, hierarchical arrangement corresponding to the structure of the extensible object model(s) and/or the portion thereof included in the search results data 344, to list a few examples.

Additionally or alternatively, the search execution process 338 may be configured to transmit the search results data 344 to (e.g., one or more processes and/or sub-systems of) the enterprise management system 120, which may perform one or more monitoring and control operations 348 with respect to the operational system(s) 110 (e.g., the particular operational system represented by the particular extensible object model that was the subject of the search operation) based at least in part on the search results data 344.

In some embodiments, the extensible object model system 140 may be configured to automatically update search objects based on changes to the extensible object model(s) with which the search objects are associated. More particularly, the model monitoring process 350 of the extensible object model system 140 may be configured to, in response to detecting a change to a modified extensible object model of the extensible object model(s) (e.g., stored in the graph database 302), update at least one search object (e.g., stored in the search object database 308) associated with the modified extensible object model based at least in part on the detected change 352. For example, the model monitoring process 350 may be configured to detect the changes 352 (e.g., any changes or changes of particular types) to the extensible object model(s) stored in the graph database 302, including possibly accessing and/or monitoring model transactions (generated by other processes of the extensible object model system 140) effecting the changes 352 to the extensible object model(s) and/or extracting data identifying, defining, and/or characterizing the effected changes 352. The model monitoring process 350 may be configured to generate an updated search object 354 based at least on the extracted data identifying, defining, and/or characterizing the changes 352 and to store the updated search object 354 in the search object database 308. In one example, the model monitoring process 350 generate the updated search objects 354 by updating references within the search objects to various data object(s) and/or properties thereof defined in the extensible object model(s) in response to detecting changes 352 to the labels, identifiers, and/or formats of the corresponding data object(s) and/or properties thereof. In another example, the model monitoring process 350 may detect changes 352 to one or more classes or schemas defined within the extensible object model(s) and generate an updated search object 354 for each existing search object that references the classes or schemas or objects thereof to reflect the updated classes or schemas.

In some embodiments, the search selection process 322 and/or the search selection interface 324 may be configured to receive the search selection input 326 specifically with respect to a current context (e.g., current computing context of the user device 160 at which the search selection input 326 is received, current communication context between the extensible object model system 140 and the user device 160 at which the search selection input 326 is received, current operational system monitoring and control context within which a search operation associated with the search selection input 326 is being performed). More particularly, the search selection interface 324 may be configured to receive the search selection input 326 specifically with respect to a subset of the one or more search objects (e.g., stored in the search object database 308) that is associated with a particular extensible object model and/or a current user (e.g., of the user device 160 at which the search selection input 326 is received).

In one example, the search selection process 322 may be configured to present the search selection interface 324 within a current computing context, communication context, and/or operational system monitoring and control context of the user device 160, enterprise management system 120, and/or extensible object model system 140 that is specifically associated with a particular extensible object model (e.g., including presenting interfaces and/or performing operations specifically with respect to a particular operational system 110 represented by the particular extensible object model), and the search operation to which the search selection input 326 is associated may be initiated and performed within that current context, in which case the search selection process 322 may be configured to automatically display and/or update the search selection interface 324 such that only a subset of search objects associated with the particular extensible object model of the current context are made available for selection in the search selection input 326 as the selected search object 334.

In another example, the search selection process 322 may be configured to present the search selection interface 324 within a current computing context, communication context, and/or operational system monitoring and control context of the user device 160, enterprise management system 120, and/or extensible object model system 140 that is specifically associated with a particular current user (e.g., the current user of the user device 160, enterprise management system 120, and/or extensible object model system 140), in which case the search selection process 322 may be configured to retrieve permissions data 336 (e.g., from the one or more data repositories 150, graph database 302, search object database 308) and to automatically display and/or update the search selection interface 324 such that only a subset of search objects associated with the current user are made available for selection in the search selection input 326 as the selected search object 334. The permissions data 336 may comprise various items of data indicating which users and/or groups of users may have access to which search objects stored in the search object database 308 and/or which users and/or groups of users may have access to which extensible object model(s).

Moreover, in some embodiments, one or more search objects (e.g., of the search objects stored in the search object database 308) may be associated with version data indicating one or more versions of each of the extensible object model(s) (and/or one or more versions of each type of extensible object model) with which the search object is compatible. In one exemplary scenario, a particular search object may be associated with and/or compatible with a particular type of extensible object model having a particular (original) version. The type of extensible object model may be subsequently updated to a new version, with changes to various aspects of the model type, such as classes, schemas, and/or types of data objects available within extensible object models of that type. However, immediately updating the particular search object to be compatible with the new version may not be possible, and it may be desirable to retain the particular search object (compatible with the original version) such that it can be used for search operations executed with respect to extensible object models of the original type. Accordingly, in some embodiments, the search selection process 322 may be configured to present and/or update the search selection interface 324 based at least in part on the version data associated with the search objects, including, for example, presenting only a subset of search objects as available for selection as the selected search object 334 in the search selection input 326, the presented subset of search objects including only the search objects having version data indicating compatibility with the type of extensible object model corresponding to an extensible object model that is currently selected for the search operation or to which the search operation is otherwise associated.

FIG. 4 is an illustration of an exemplary search configuration screen 406 (e.g., of the search configuration interface 316). The search configuration screen 406 may be presented within a GUI 404 rendered on a display 402 of a computing device such as a user device 160. The GUI 404 may be presented as part of a native application user interface or a user interface of a web application (e.g., rendered via a web browser application). The search configuration screen 406 comprises interactable elements configured to receive (e.g., as user input) the search configuration input (such as that embodied by the search configuration input 318 defined and described with respect to FIG. 3).

More particularly, the search configuration screen 406 comprises a user context indicator 408, a series of configuration input interactable elements 410 of various types, add buttons 412, remove buttons 414, and an existing search object selector 416.

The user context indicator 408 may be a graphical element comprising textual data identifying a user account associated with a current user (e.g., of the extensible object model system 140, enterprise management system 120, and/or user devices 160), for example, by indicating a user identifier associated with the user account for the current user. In the illustrated example, the user identifier identifies the current user as "User1."

In some embodiments, the user account indicated by the user context indicator 408 may correspond to user accounts referenced directly or indirectly by any of the extensible object model(s) and/or the permissions data 336.

The extensible object model system 140 may be configured to present the search configuration screen 406 based at least in part on the user account of the current user (e.g., indicated by the user context indicator 408). For example, the extensible object model system 140 may be configured to present the configuration input interactable elements 410 enabling selection from one or more sets of objects, with the one or more sets of objects available by selection via the interactable elements 410 being determined based at least in part on the user account of the current user (e.g., by presenting as selectable options within each set of objects only those objects associated with the current user and/or for which the current user is indicated to be authorized to access according to the permissions data 336).

Each of the configuration input interactable elements 410 may be configured to receive input or a selection indicative of one of any of the various characteristics, aspects, properties, and/or parameters associated with a type of search operation represented by a search object being modified and/or created via the search configuration screen 406. For example, text input fields of the configuration input interactable elements 410 may be configured to receive text input representing an item of data in the search configuration input 318, while selectors of the configuration input interactable elements 410 may be configured to receive a selection from a set of objects presented as options (e.g., indicated in a drop menu), the selection being indicative of an item of data in the search configuration input 318.

In the illustrated example, the search configuration screen 406 comprises interactable elements 410 including a display name input field 410a, a description input field 410b, a system/graph type selector 410c, an input parameter object type selector 410d, an input parameter object property selector 410e, an input parameter name input field 410f, a first match type selector 410g, a first match name input field 410h, a condition type selector 410i, a first operand type selector 410j, a first operand name selector 410k, an operator selector 410l, a second operand type selector 410m, a second operand name selector 410n, a second match type selector 410o, a second match name input field 410p, a start object input field 410q, an end object input field 410r, a path match relation selector 410s, and a path match direction selector 410t.

The display name input field 410a may be a text input field configured to receive text input corresponding to a (e.g., user-configurable) display name to be assigned to and/or associated with a new or modified search object. The display name represented by the text input received via the display name input field 410a may be used to visually indicate and/or identify the particular search object to which the display name is assigned (e.g., within any screens of the search configuration interface 316, search selection interface 324, and/or results interface 346). In the illustrated example, the display name is entered as "Assets for Site."

The description input field 410b may be a text input field configured to receive text input corresponding to a (e.g., user-configurable) description to be assigned to and/or associated with a new or modified search object. The description represented by the text input received via the description input field 410b may be presented or displayed by the extensible object model system 140 in connection with the particular search object to which the description is assigned (e.g., within any screens of the search configuration interface 316, search selection interface 324, and/or results interface 346). In the illustrated example, the description is entered as "Returns all assets contained within a selected site."

Moreover, the display name represented by the text input received via the display name input field 410a and/or the description represented by the text input received via the description input field 410b may be part of and/or comprised by the text data associated with a particular search object to which the respective items are assigned in the search object database 308, which text data is used to perform search operations from among the search objects stored in the search object database 308 based at least in part on the text search terms 332 received in the text search input 330 (e.g., by comparing the text search terms 332 to the text data, including the display name and/or the description, and returning search objects having text data matching the text search terms 332).

The system/graph type selector 410c may be a selector configured to receive a selection corresponding to a model type for extensible object models (and/or types of operational systems 110 represented by models of the of the model type) to be assigned to and/or associated with a new or modified search object. The system/graph type selector 410c may be configured to receive the model type selection from (e.g., predefined, user-configured) set of model type objects presented as options (e.g., in a drop menu). The model type represented by the selection received via the system/graph type selector 410c may determine which individual or groups of extensible object models will be compatible with the new or modified search object, among other examples. In the illustrated example, the system/graph type selector 410c indicates a selection of a "Building" model type.

Some of the configuration input interactable elements 410 may relate to various items of data in the required input parameter data of a new or modified search object, such as the input parameter object type selector 410d, the input parameter object property selector 410e, and the input parameter name input field 410f.

More particularly, the input parameter object type selector 410d may be a selector configured to receive a selection corresponding to an object type of a data object (e.g., of an extensible object model) that one of the required input parameters defined for a new or modified search object will be. The input parameter object type selector 410d may be configured to receive the model type selection from (e.g., predefined, user-configured) set of object type objects presented as options (e.g., in a drop menu). The set of options available for selection via the input parameter object type selector 410d may be determined based at least in part on the selected model type indicated in the system/graph type selector 410c (e.g., object types specifically associated with the selected model type and/or object types defined for models of the model type). In the illustrated example, the input parameter object type selector 410*d* indicates a selection of a "Site" object type.

The input parameter object property selector 410*e* may be a selector configured to receive a selection corresponding to a property for a data object (e.g., of an extensible object model) that one of the required input parameters defined for a new or modified search object will correspond to. The input parameter object property selector 410*e* may be configured to receive the property selection from a (e.g., predefined, user-configured) set of properties presented as options (e.g., in a drop menu). The set of options available for selection via the input parameter property selector 410*e* may be determined based at least in part on the selected object type indicated in the input parameter object type selector 410*d* (e.g., properties specifically associated with the selected object type). The property selected via the input parameter object property selector 410*e* (e.g., in conjunction with the object type selected via the input parameter object type selector 410*d*) may be used to identify and/or indicate the required input parameter within the required input parameter data of the new or modified search object, in one example. In the illustrated example, the input parameter property selector 410*e* indicates a selection of a "GUID" property, which may correspond to a (e.g., globally unique) identifier assigned to a particular object to which the required input parameter for the new or modified search object will correspond.

The input parameter name input field 410*f* may be a text input field configured to receive text input corresponding to a variable name to be used to refer to one of the required input parameters defined for a new or modified search object (e.g., in the search definition data of the search object). In the illustrated example, the variable name is entered as "SiteID."

Some of the configuration input interactable elements 410 may relate to various items of data in the search definition data of a new or modified search object, such as the first match type selector 410*g*, first match name input field 410*h*, condition type selector 410*i*, first operand type selector 410*j*, first operand name selector 410*k*, operator selector 410*l*, second operand type selector 410*m*, second operand name selector 410*n*, second match type selector 410*o*, second match name input field 410*p*, start object input field 410*q*, end object input field 410*r*, path match relation selector 410*s*, and path match direction selector 410*t*. For example, collectively, these interactable elements may define which particular data object(s) should be targeted or selected (e.g., data objects having properties and/or attributes matching certain items of the search configuration input 318 and/or parameter selection input 328) and/or which particular properties of the targeted or selected data objects and/or particular types of data object(s) (or properties thereof) and/or relationships (or properties thereof) associated with the targeted or selected data objects should be included in the model data returned as the results of a search operation of the type represented by the new or modified search object.

Of the configuration input interactable elements 410 related to the search definition data of the new or modified search object, different sets of the elements may relate to different match objects, such as, in the illustrated example, a first match object and a second match object. These match objects may represent, for example, data object(s) that are targeted or selected from an extensible object model in a search operation (e.g., by evaluating properties of the data object(s) against one or more items of data referenced in the search definition data of the new or modified search object).

In the illustrated example, elements related to the first match object include the first match type selector 410*g*, first match name input field 410*h*, condition type selector 410*i*, first operand type selector 410*j*, first operand name selector 410*k*, operator selector 410*l*, second operand type selector 410*m*, second operand name selector 410*n*.

The first match type selector 410*g* may be a selector configured to receive a selection corresponding to a match type to be assigned to the first match object as defined in the search definition data of a new or modified search object. The match type may correspond to various data object type(s) in the extensible object model(s) and/or combinations of different object type(s), such as nodes, relationships, and/or paths traced from a specified or targeted start node (or type thereof) to a specified or targeted end node (or type thereof) along one or more relationships (e.g., of specified or targeted types). In the illustrated example, the first match type selector 410*g* indicates a selection of a "Node" match type, indicating, for example, that the remaining elements related to the first match object correspond to targeted or selected nodes.

The first match name input field 410*h* may be a text input field configured to receive text input corresponding to a name to be used in the search definition data of the new or modified search object to refer to one or more selected or targeted data object(s) associated with the first match object (e.g., matching the various parameters indicated via the remaining interactable elements related to the first match object). In the illustrated example, the name for the first match object is entered as "site."

The condition type selector 410*i* may be a selector configured to receive a selection corresponding to a condition type to be assigned to the first match object as defined in the search definition data of a new or modified search object and to determine which remaining input should be prompted in order to define the first match object. The condition type may be one of various (e.g., predefined) condition types, each representing a conditional evaluation available for targeting or selecting data objects in the graph database 302. In the illustrated example, the condition type selector 410*i* indicates a selection of a "BinaryPredicate" condition type, indicating, for example, that the condition used to evaluate data object(s) and find matching data object(s) for the first match type is based on a binary function with a resolution of true or false (e.g., a comparison of one value to another to determine whether the values are equal, whether one is greater or less than the other, and the like).

The first operand type selector 410*j* may be a selector configured to receive a selection corresponding to an operand type for a first operand in the condition corresponding to the selection indicated in the condition type selector 410*i*. The operand types presented as available for selection in the first operand type selector 410*j* may comprise various (e.g., predefined) operand types, including, for example, properties (e.g., of data objects of the extensible object model(s)) and/or input parameters (e.g., defined elsewhere in the search configuration screen 406). In the illustrated example, the first operand type selector 410*j* indicates a selection of a "Property" operand type.

The first operand name selector 410*k* may be a selector configured to receive a selection corresponding to a name to use (e.g., in the search definition data of the new or modified search object) and/or a property (e.g., of a data object being evaluated) corresponding to the first operand. The operand names presented as available for selection in the first operand name selector 410*k* may correspond to various properties of data object(s) (e.g., being evaluated) and/or may be determined based on the operand type selected via the first operand type selector 410*j*. In the illustrated example, the first operand name selector 410*k* indicates a selection of a "GUID" operand name.

The operator selector 410*l* may be a selector configured to receive a selection corresponding to an operator type indicating how the first operand and second operand of the relevant condition of the first match type are evaluated (and, accordingly, how that condition is defined in the search definition data of the new or modified search object). The operator may be one of various (e.g., predefined) operators, each representing a specific conditional evaluation between the first and second operand (e.g., equals, greater than, less than) for targeting or selecting data objects in the graph database 302. In the illustrated example, the operator selector 410*l* indicates a selection of an "EQUALS" operator, indicating, for example, that the condition will evaluate as true if the first operand is determined to be equal to the second operand.

The second operand type selector 410*m* may be a selector configured to receive a selection corresponding to an operand type for a second operand in the condition corresponding to the selection indicated in the condition type selector 410*i*. As before, the operand types presented as available for selection in the second operand type selector 410*m* may comprise various (e.g., predefined) operand types, including, for example, properties (e.g., of data objects of the extensible object model(s)) and/or input parameters (e.g., defined elsewhere in the search configuration screen 406). In the illustrated example, the first operand type selector 410*j* indicates a selection of an "Input" operand type, indicating that the second operand will be selectable from among the input parameters defined elsewhere via the search configuration screen 406.

The second operand name selector 410*n* may be a selector configured to receive a selection corresponding to a name to use (e.g., in the search definition data of the new or modified search object) and/or a variable (e.g., representing one of the input parameters defined for the search object) corresponding to the second operand. The operand names presented as available for selection in the second operand name selector 410*n* may correspond to the required input parameters that have been defined for the search object elsewhere on the search configuration screen 406 and/or may be determined based on the operand type selected via the second operand type selector 410*m*. In the illustrated example, the second operand name selector 410*n* indicates a selection of the "SiteID" operand name, corresponding to the input parameter defined elsewhere and given the name of "SiteID" via the input parameter name input field 410*f*.

In the illustrated example, elements related to the second match object include the second match type selector 410*o*, second match name input field 410*p*, start object input field 410*q*, end object input field 410*r*, path match relation selector 410*s*, and path match direction selector 410*t*.

The second match type selector 410*o* may be a selector configured to receive a selection corresponding to a match type to be assigned to the second match object as defined in the search definition data of a new or modified search object. As before, the match type may correspond to various data object type(s) in the extensible object model(s) and/or combinations of different object type(s), such as nodes, relationships, and/or paths traced from a specified or targeted start node (or type thereof) to a specified or targeted end node (or type thereof) along one or more relationships (e.g., of specified or targeted types). In the illustrated example, the second match type selector 410*o* indicates a selection of a "Path" match type, indicating, for example, that the remaining elements related to the second match object correspond to targeted or selected paths, including nodes starting from a start node, ending at an end node, and including any intervening nodes and relationships between the start and end node.

The second match name input field 410*p* may be a text input field configured to receive text input corresponding to a name to be used in the search definition data of the new or modified search object to refer to one or more selected or targeted data object(s) associated with the second match object (e.g., matching the various parameters indicated via the remaining interactable elements related to the second match object). In the illustrated example, the name for the second match object is entered as "assets."

The start object input field 410*q* may be a text input field configured to receive text input corresponding to a name to be used in the search definition data of the new or modified search object to refer to a data object where the selected or targeted path starts and/or to use in identifying and/or selecting the data object where the targeted path starts with respect to a particular extensible object model in the context of a particular instance of a type of search operation represented by the new or modified search object. In the illustrated example, the name for the starting object is entered as "site."

The end object input field 410*r* may be a text input field configured to receive text input corresponding to a name to be used in the search definition data of the new or modified search object to refer to a data object where the selected or targeted path ends and/or to use in identifying and/or selecting the data object where the targeted path ends with respect to a particular extensible object model in the context of a particular instance of a type of search operation represented by the new or modified search object. In the illustrated example, the name for the ending object is entered as "asset."

The path match relation selector 410*s* may be a selector configured to receive a selection corresponding to a relationship type indicating which relationships between the starting object identified via the start object input field 410*q* and the ending object identified via the end object input field 410*r* should be selected or targeted. In the illustrated example, the path match relation selector 410*s* indicates a selection of an "IS_CONTAINED_BY" relationship type.

The path match direction selector 410*t* may be a selector configured to receive a selection corresponding to a relationship direction indicating, as before, which relationships between the starting object identified via the start object input field 410*q* and the ending object identified via the end object input field 410*r* should be selected or targeted. In the illustrated example, the path match direction selector 410*t* indicates a selection of an "REVERSE" direction for the targeted relationship(s), indicating that the targeted relationships are those with a direction from the ending object to the starting object, namely those relationships indicating particular assets that are contained by particular sites.

The configuration input interactable elements 410 illustrated and described with respect to the example of FIG. 4 are presented herein for the purposes of illustration, but any suitable configuration input interactable elements 410, configured to receive any suitable items of data in the search configuration input 318 may be provided on the search configuration screen 406 and/or by the search configuration interface 316.

In some embodiments, the add buttons 412 and remove buttons 414 of the search configuration screen 406 may be configured to enable full customization of the search configuration input 318 received via the search configuration screen 406. For example, the add buttons 412 may enable selection or input of additional items of data (e.g., with respect to a baseline or current number of items of data available for input or selection on an initial or default state, or a current state, of the search configuration screen 406). More particularly, the search configuration process 314 may be configured to update the search configuration screen 406 to reveal additional sets of configuration input interactable elements 410 in response to selection of one of the add buttons 412 and/or to hide, remove, or clear from the screen sets of configuration input interactable elements 410 in response to selection of one of the remove buttons 414. Different subsets of the search configuration interactable elements 410 may be associated with particular add buttons 412 or remove buttons 414, the different subsets each being associated with, for example, input elements concerning required input parameters for a new or modified search object, input elements concerning match objects for the search object, and/or input elements concerning conditions associated with each match object.

In the illustrated example, the search configuration screen 406 comprises a first add button 412a associated with required input parameters for a new or modified search object and a first remove button 414a associated with a particular set of interactable elements for defining a particular required input parameter of the search object. In response to selection of the first add button 412a, the search configuration process 314 may be configured to update the search configuration screen 406 such that a new set of interactable elements analogous to the input parameter object type selector 410d, input parameter object property selector 410e, and input parameter name input field 410f are revealed, the new set corresponding to a second required input parameter to be defined for the search object in addition to that defined by the existing set. Similarly, in response to selection of the first remove button 414a, the search configuration process 314 may be configured to update the search configuration screen 406 such that any input or selections entered into the input parameter object type selector 410d, input parameter object property selector 410e, and input parameter name input field 410f are cleared. Moreover, in response to selection of a remove button 414 associated with a second set of interactable elements for a second required input parameter (not illustrated), the search configuration process 314 may be configured to update the search configuration screen 406 such that the second set of interactable elements for the second required input parameter is hidden or removed.

In a similar manner, the second add button 412b may enable revealing of a second set (or more) of interactable elements associated with a second condition for the first match object, the second set, in one example, comprising elements analogous to the condition type selector 410i, first operand type selector 410j, first operand name selector 410k, operator selector 410l, second operand type selector 410m, and second operand name selector 410n. Remove buttons 414 associated with the respective interactable elements for each condition, including the third remove button 414c, may enable hiding or clearing of the elements used to define the different conditions for the first match object.

Similarly, the third add button 412c may enable revealing of a third set (or more) of interactable elements associated with a third match object, the third set, in one example, comprising elements analogous to the first match type selector 410g and first match name input field 410h associated with the first match object and/or the second match type selector 410o, second match name input field 410p, start object input field 410q, end object input field 410r, path match relation selector 410s, and path match direction selector 410t associated with the second match object. Remove buttons 414 associated with the respective interactable elements for each match object, including the second remove button 414b and the fourth remove button 414d, may enable hiding or clearing of the elements used to define the different match objects depending on which button was selected.

The existing search object selector 416 of the search configuration screen 406 may be configured to receive a selection corresponding to an existing search object (e.g., stored in the search object database 308 and/or indicated in an instance of the search object data 312) to be modified via the search configuration screen 406. For example, in response to selection of one of the search objects indicated in the existing search object selector 416, the search configuration process 314 may be configured to update the search configuration screen 406 to include interactable elements 410 corresponding to each item of data defined for the selected search object and populated with a current value for each item of data. The search configuration process 314 may be configured to generate a modified search object corresponding to the selected search object by overwriting the current values for the selected search object with any changed or newly added values, remove any attributes that were removed via the search configuration screen 406, and/or to add any new attributes that do not correspond to any of those of the selected search object but were added via the search configuration screen 406. The modified search object may be stored in the search object database 308. In some embodiments, the search configuration process 314 may be configured to present within the existing search object selector 416 as available for selection only a subset of search objects associated with the current user (e.g., search objects that the current user is authorized to access and/or modify according to the permissions data 336).

FIG. 5 is an illustration of an exemplary search selection screen 502 (e.g., of the search selection interface 324). The search selection screen 502 may be presented within a GUI 404 rendered on a display 402 of a computing device such as a user device 160. As before, the GUI 404 may be presented as part of a native application user interface or a user interface of a web application (e.g., rendered via a web browser application). The search selection screen 502 comprises interactable elements configured to receive (e.g., as user input) search selection input, parameter selection input, and/or text search input (such as that embodied, respectively, by the search selection input 318, parameter selection input 328, and/or text search input 330 defined and described with respect to FIG. 3).

Similar to the search configuration screen 406, in the illustrated example, the search selection screen 502 comprises the user context indicator 408. Additionally, in the illustrated example, the search selection screen 502 further comprises a set of interactable elements configured to receive the search selection input 318, parameter selection input 328, and/or text search input 330, including a text search input field 504, a system/graph type selector 506, a model selector 508, search object selector 510, and an input parameter selector 512.

As before, the extensible object model system 140 may be configured to present the search selection screen 502 based at least in part on the user account of the current user (e.g., indicated by the user context indicator 408). For example, the extensible object model system 140 may be configured to present interactable elements enabling selection from one or more sets of objects, with the one or more sets of objects available by selection via the interactable elements being determined based at least in part on the user account of the current user (e.g., by presenting as selectable options within each set of objects only those objects associated with the current user and/or for which the current user is indicated to be authorized to access according to the permissions data 336). In another example, the extensible object model system 140 may be configured to present a filtered set of results from a search operation from among the search objects stored in the search object database 308 (e.g., based on text search terms 332 from the text search input 330 received via the text search input field 504), the filtered set of results being filtered based at least in part on the permissions data 336 (e.g., filtered to include only those objects associated with the current user and/or for which the current user is indicated to be authorized to access according to the permissions data 336).

The text search input field 504 may be a text input field configured to receive the text search input 330 comprising the text search terms 332 for searching from among the search objects stored in the search object database 308. In response to receiving text search input 330 via the text search input field 504, the search selection process 322 may be configured to update the search selection screen 502 to display any results from a search from among the stored search objects based on the text search terms 332 included in the text search input along with one or more interactable elements configured to receive input indicative of a selection (e.g., as the selected search object 334) of one of the search objects indicated in the results of the search from among the stored search objects.

The system/graph type selector 506 may be a selector configured to receive a selection corresponding to a model type for extensible object models (and/or types of operational systems 110 represented by models of the of the model type), the selected model type representing a filtering parameter for updating the search selection screen 502 to display a filtered set of search objects available for selection. The system/graph type selector 506 may be configured to receive the model type selection from (e.g., predefined, user-configured) set of model type objects presented as options (e.g., in a drop menu). The model type represented by the selection received via the system/graph type selector 506 may determine which set of objects are presented as available for selection via the model selector 508, for example.

The model selector 508 may be a selector configured to receive a selection corresponding to a particular extensible object model, the selected extensible object model being included in the search selection input 326 (and/or, in some embodiments, in the parameter selection input 328) and representing which extensible object model should be the subject of a particular instance of the type of search operation represented by the selected search object 334 being selected via the search selection screen 502. The model selector 508 may be configured to receive the model selection from among a set of extensible object models presented as options (e.g., in a drop menu), the set of extensible object models presented as options being determined by the search selection process 322, in some examples, based at least in part on selections received via the system/graph type selector 506, the current user, and/or the permissions data 336, to list a few examples.

The search object selector 510 may be a selector configured to receive a selection corresponding to a particular search object (e.g., stored in the search object database 308), the selected search object being included in the search selection input 326 and representing and/or identifying the selected search object 334 retrieved in connection with executing a particular instance of the type of search operation represented by the selected search object 334. The search object selector 510 may be configured to receive the search object selection from among a set of search objects presented as options (e.g., in a drop menu) each in the form of the display name associated with the presented search object, the set of search objects presented as options being determined by the search selection process 322, in some examples, based at least in part on selections received via the system/graph type selector 506, selections received via the model selector 508, the current user, and/or the permissions data 336, to list a few examples.

The input parameter selector 512 may be a selector configured to receive a selection corresponding to a particular data object (e.g., defined in the extensible object model selected via the model selector 508), and, more particularly, to a selected parameter value represented by the particular data object, the selected data object and/or value being included in the parameter selection input 328 and representing and/or identifying the parameter value 335 used by the search execution process 338 to generate the executable search query 340. The input parameter selector 512 may be configured to receive the data object and/or value selection from among a set of objects and/or values presented as options (e.g., in a drop menu), the set of objects and/or values presented as options being determined by the search selection process 322, in some examples, based at least in part on the selection received via the search object selector 510. In some embodiments, in response to receiving a selection of a selected search object via the search object selector 510, the search selection process 322 may be configured update the search selection screen 502 to reveal one or more interactable elements (such as the input parameter selector 512) for receiving the parameter selection input 328 associated with the selected search object. In one example, the search selection process 322 may be configured to interactable elements (such as the input parameter selector 512) corresponding to each of the required input parameters defined in the required input parameter data for the selected search object.

FIG. 6 is an illustration of an exemplary results screen 602 (e.g., of the results interface 346). The results screen 602 may be presented within a GUI 404 rendered on a display 402 of a computing device such as a user device 160. As before, the GUI 404 may be presented as part of a native application user interface or a user interface of a web application (e.g., rendered via a web browser application). The results screen 602 comprises one or more panes in which one or more graphical elements representing various items of search results data (such as that embodied in the search results data 344 defined and described with respect to FIG. 3) are rendered.

More particularly, in the illustrated example, the results screen 602 comprises a details pane 604, a graph view pane 606, and a nested records view pane 608.

The details pane 604 may comprise one or more graphical elements for presenting particular items of data from the search results data 344, such as data associated with, comprising, and/or derived from the selected search object 334 and/or corresponding parameter values 335, and/or data indicative of, derived from, and/or associated with a monitoring and control context within which the search operation was performed. In the illustrated example, the details pane 604 comprises textual data identifying the search object representing the type of search operation associated with the present search operation, textual data identifying and/or characterizing input parameter data (e.g., parameter values 335) associated with the present search operation, and textual data identifying which particular extensible object model was the subject of the present search operation.

The graph view pane 606 may comprise one or more graphical elements for presenting particular items of data from the search results data 344 (e.g., the object model data 342 resulting from the search operation) in a graph format, with the one or more graphical elements representing nodes and/or relationships indicated in the search results data 344 as shapes in a visual arrangement corresponding to the structure of the extensible object model(s) and/or the portion thereof included in the search results data 344.

The nested records view pane 608 may comprise one or more graphical elements for presenting particular items of data from the search results data 344 (e.g., the object model data 342 resulting from the search operation) in a nested record format, with nodes and/or relationships indicated in the search results data 344 represented by items of textual data in a nested, hierarchical arrangement corresponding to the structure of the extensible object model(s) and/or the portion thereof included in the search results data 344.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIGS. 7-9 illustrate flowcharts including operational blocks of example processes in accordance with at least some example embodiments of the present disclosure. In some embodiments, the computer-implemented processes of FIGS. 7-9 are each embodied by computer program code stored on a non-transitory computer-readable medium of a computer program product configured for execution to perform the computer-implemented method. Alternatively or additionally, in some embodiments, the example processes of FIGS. 7-9 are performed by one or more specially configured computing devices, such as the specially configured apparatus 200 (e.g., via search configuration circuitry 212, search selection circuitry 210, search execution circuitry 214, and/or model monitoring circuitry 216). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example processes of FIGS. 7-9. In some embodiments, the specially configured apparatus 200 includes and/or otherwise is in communication with one or more external apparatuses, systems, devices, and/or the like, to perform one or more of the operations as depicted and described. While the operational blocks of each of the example processes are depicted in each of FIGS. 7-9 in a particular order, this should not be understood as requiring that such operations be performed in the particular order shown or in sequential order, or that all illustrated operations be performed.

FIG. 7 illustrates a flowchart including operational blocks of an example process 700 for selecting and executing a search object, in accordance with at least some example embodiments of the present disclosure.

The process 700 begins at operation 702, at which an apparatus (such as, but not limited to, the apparatus 200 or circuitry thereof as described above in connection with FIG. 2) presents a search selection interface configured to receive search selection input with respect to one or more search objects stored in a search object database, which may be associated with one or more extensible object models representing the one or more operational systems 110. In various embodiments, each search object of the one or more search objects referenced with respect to operation 702 may define a type of search operation to be performed with respect to the extensible object model(s). In some embodiments, the search selection interface presented at operation 702 may correspond to and/or comprise the search selection interface 324 as defined and described with respect to FIG. 3, and presenting the search selection interface 324 at operation 702 may comprise some or all of the analogous functionality attributed to the search selection process 322 as described with respect to FIG. 3. Additionally or alternatively, the search selection interface presented at operation 702 may correspond to and/or comprise the search selection screen 502 as defined and described with respect to FIG. 5. Additionally, the search objects referenced at operation 702 may correspond to and/or comprise the predefined search objects 310, the new and modified search objects 320, and/or the updated search objects 354, and the search object database in which the search object(s) referenced at operation 702 are stored may correspond to and/or comprise the search object database 308, as defined and described with respect to FIG. 3. Moreover, the extensible object model(s) referenced with respect to operation 702 may correspond to and/or comprise the extensible object model(s) defined and described with respect to FIGS. 1 and 3, including the extensible object model(s) stored in the graph database 302 as described with respect to FIG. 3.

At operation 704 of the process 700, an apparatus (such as, but not limited to, the apparatus 200 or circuitry thereof described above in connection with FIG. 2) receives search selection input via the search selection interface presented at operation 702, the search selection input being associated with a particular extensible object model of the one or more extensible object models referenced with respect to operation 702. The search selection input received at operation 704 may indicate a selected search object (of the search object(s) referenced with respect to operation 702), which selected search object may correspond to and/or comprise the selected search object 334 as defined and described with respect to FIG. 3. Moreover, in various embodiments, the search selection input received at operation 704 may correspond to and/or comprise the search selection input 326 as defined and described with respect to FIG. 3, and receiving the search selection input at operation 704 may comprise some or all of the analogous functionality attributed to the search selection process 322 as described with respect to FIG. 3.

In some embodiments, the apparatus may also receive via the search selection interface presented at operation 702 text search input, which may correspond to and/or comprise the text search input 330 as defined and described with respect to FIG. 3, and the search selection input received at operation 704 may be received based at least in part on the received text search input, including some or all of the analogous functionality attributed to the search selection process 322 as described with respect to FIG. 3.

At operation 706 of the process 700, an apparatus (such as, but not limited to, the apparatus 200 or circuitry thereof described above in connection with FIG. 2) retrieves from the search object database the selected search object indicated by the search selection input received at operation 704. In various embodiments, retrieving the selected search object at operation 706 may comprise some or all of the analogous functionality attributed to the search selection process 322 as described with respect to FIG. 3.

At operation 708 of the process 700, an apparatus (such as, but not limited to, the apparatus 200 or circuitry thereof described above in connection with FIG. 2) generates an executable search query representing a particular instance of the type of search operation defined by the selected search object retrieved from the search object database at operation 706 based at least in part on the selected search object. In various embodiments, the executable search query generated at operation 708 may correspond to and/or comprise the executable search query 340 as defined and described with respect to FIG. 3, and generating the executable search query at operation 708 may comprise some or all of the analogous functionality attributed to the search execution process 338 as described with respect to FIG. 3.

In some embodiments, generating the executable search query at operation 708 may comprise generating the executable search query based at least in part on parameter selection input received via the search selection interface presented at operation 702 with respect to at least one search object (e.g., the selected search object indicated by the search selection input received at operation 704) and the particular extensible object model. The parameter selection input may indicate a selection of one or more values corresponding to one or more required parameters comprised by the at least one search object. The parameter selection input may correspond to and/or comprise the parameter selection input 328 as defined and described with respect to FIG. 3, the one or more values corresponding to the one or more required parameters may correspond to and/or comprise the parameter values 335 as defined and described with respect to FIG. 3, and receiving the parameter selection input may comprise some or all of the analogous functionality attributed to the search selection process 322 as described with respect to FIG. 3.

At operation 710 of the process 700, an apparatus (such as, but not limited to, the apparatus 200 or circuitry thereof described above in connection with FIG. 2) submits the executable search query generated at operation 708 for execution against the particular extensible object model. In various embodiments, submitting the executable search query for execution at operation 710 may comprise some or all of the analogous functionality attributed to the search execution process 338 as described with respect to FIG. 3.

At operation 712 of the process 700, an apparatus (such as, but not limited to, the apparatus 200 or circuitry thereof described above in connection with FIG. 2) receives object model data resulting from the execution of the executable search query against the particular extensible object model. The object model data received at operation 712 may comprise a portion of the particular extensible object model. In some embodiments, the object model data received at operation 712 corresponds to and/or comprises some or all of the object model data 342 as defined and described with respect to FIG. 3, and receiving the object model data at operation 712 may comprise some or all of the analogous functionality attributed to the search execution process 338 as described with respect to FIG. 3.

At operation 714 of the process 700, an apparatus (such as, but not limited to, the apparatus 200 or circuitry thereof described above in connection with FIG. 2) generates search results data based at least in part on the object model data received at operation 712. In some embodiments, the search results data generated at operation 714 may correspond to and/or comprise some or all of the search results data 344 as defined and described with respect to FIG. 3, and generating the search results data at operation 714 may comprise some or all of the analogous functionality attributed to the search execution process 338 as described with respect to FIG. 3.

At operation 716 of the process 700, an apparatus (such as, but not limited to, the apparatus 200 or circuitry thereof described above in connection with FIG. 2) presents a results interface for displaying the search results data generated at operation 714. In some embodiments, the results interface presented at operation 716 corresponds to and/or comprises the results interface 346 as defined and described with respect to FIG. 3, and presenting the results interface at operation 716 may comprise some or all of the analogous functionality attributed to the search execution process 338 as described with respect to FIG. 3. Additionally or alternatively, the results interface presented at operation 716 may correspond to and/or comprise the results screen 602 as defined and described with respect to FIG. 6.

FIG. 8 illustrates a flowchart including operational blocks of an example process 800 for configuring search objects, in accordance with at least some example embodiments of the present disclosure.

The process 800 begins at operation 802, at which an apparatus (such as, but not limited to, the apparatus 200 or circuitry thereof as described above in connection with FIG. 2) presents a search configuration interface configured to receive search configuration input for creating new search objects to add to one or more search objects stored in a search object database or for modifying existing search objects of the one or more search objects stored in the search object database. In various embodiments, the search object database and the search object(s) stored therein referenced with respect to operation 802 may correspond to and/or comprise the search object database and search object(s) as referenced, defined, and described with respect to the various operations of the process 700. Additionally, the search configuration interface presented at operation 802 may correspond to and/or comprise the search configuration interface 316 as defined and described with respect to FIG. 3, and presenting the search configuration interface 316 at operation 802 may comprise some or all of the analogous functionality attributed to the search configuration process 314 as described with respect to FIG. 3. Moreover, the search configuration interface presented at operation 802 may correspond to and/or comprise the search configuration screen 406 as defined and described with respect to FIG. 4.

At operation 804 of the process 800, an apparatus (such as, but not limited to, the apparatus 200 or circuitry thereof described above in connection with FIG. 2) receives, via the search configuration interface presented at operation 802, the search configuration input referenced and defined with respect to operation 802. In some embodiments, the search configuration input received at operation 804 may correspond to and/or comprise the search configuration input 318 as defined and described with respect to FIG. 3, and receiving the search configuration input at operation 804 may comprise some or all of the analogous functionality attributed to the search configuration process 314 as described with respect to FIG. 3.

At operation 806 of the process 800, an apparatus (such as, but not limited to, the apparatus 200 or circuitry thereof described above in connection with FIG. 2) generates or modifies a search object of the search object(s) referenced with respect to operation 802 based at least in part on the search configuration input received at operation 804. In various embodiments, the search object generated or modified at operation 806 may correspond to and/or comprise the new and modified search objects 320 as defined and described with respect to FIG. 3, and generating or modifying the search object at operation 806 may comprise some or all of the analogous functionality attributed to the search configuration process 314 as described with respect to FIG. 3.

At operation 808 of the process 800, an apparatus (such as, but not limited to, the apparatus 200 or circuitry thereof described above in connection with FIG. 2) stores the search object generated or modified at operation 806 in the search object database. In various embodiments, storing the generated or modified search object in the search object database at operation 808 may comprise some or all of the analogous functionality attributed to the search configuration process 314 as described with respect to FIG. 3.

FIG. 9 illustrates a flowchart including operational blocks of an example process 900 for updating search objects based on changes to extensible object models, in accordance with at least some example embodiments of the present disclosure.

The process 900 begins at operation 902, at which an apparatus (such as, but not limited to, the apparatus 200 or circuitry thereof as described above in connection with FIG. 2) monitors a graph database for changes to one or more extensible object models representing the operational system(s) 110. In various embodiments, the graph database and the extensible object model(s) stored therein referenced with respect to operation 802 may correspond to and/or comprise the graph database and extensible object model(s) as referenced, defined, and described with respect to the various operations of the process 700. Moreover, monitoring the graph database at operation 902 may comprise some or all of the analogous functionality attributed to the model monitoring process 350 as described with respect to FIG. 3.

At operation 904 of the process 900, an apparatus (such as, but not limited to, the apparatus 200 or circuitry thereof described above in connection with FIG. 2), in response to detecting a change to a modified extensible object model of the extensible object model(s) referenced with respect to operation 902, updates at least one search object (of one or more search objects stored in a search object database) associated with the modified extensible object model based at least in part on the detected change. In various embodiments, the search object database and the search object(s) stored therein referenced with respect to operation 902 may correspond to and/or comprise the search object database and search object(s) as referenced, defined, and described with respect to the various operations of the process 700. Moreover, the change detected at operation 904 may correspond to and/or be comprised by the detected changes 352 as defined and described with respect to FIG. 3, and detecting the change at operation 904 may comprise some or all of the analogous functionality as described with respect to FIG. 3. Additionally or alternatively, the at least one search object updated at operation 904 may correspond to and/or be comprised by the updated search objects 354 as defined and described with respect to FIG. 3, and updating the at least one search object at operation 904 may comprise some or all of the analogous functionality attributed to the model monitoring process 350 as described with respect to FIG. 3.

At operation 906 of the process 900, an apparatus (such as, but not limited to, the apparatus 200 or circuitry thereof described above in connection with FIG. 2) stores the at least one search object updated at operation 904 in the search object database. In various embodiments, storing the at least one search object at operation 906 may comprise some or all of the analogous functionality attributed to the model monitoring process 350 as described with respect to FIG. 3.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non-transitory memory and the program code are configured to, with the at least one processor, cause the apparatus to at least:
   present a search selection interface configured to receive search selection input indicating a selected search object of one or more search objects stored in a search object database associated with one or more extensible object models representing one or more operational systems, wherein each search object of the one or more search objects defines a type of search operation to be performed with respect to the one or more extensible object models;
   receive, via the search selection interface, search selection input associated with a particular extensible object model of the one or more extensible object models;
   retrieve from the search object database the selected search object indicated by the received search selection input;
   generate an executable search query representing a particular instance of the type of search operation defined by the selected search object retrieved from the search object database based at least in part on the selected search object;
   submit the executable search query for execution against the particular extensible object model;
   receive object model data resulting from the execution of the executable search query against the particular extensible object model, wherein the object model data comprises a portion of the particular extensible object model;
   generate search results data based at least in part on the received object model data; and
   present a results interface for displaying the search results data.

2. The apparatus of claim 1, wherein each search object of the one or more search objects comprises a user-configurable display name.

3. The apparatus of claim 1, wherein at least one search object of the one or more search objects comprises one or more required parameters required by the type of search operation defined by the at least one search object, the search selection interface is configured to receive parameter selection input with respect to the at least one search object and the particular extensible object model, the parameter selection input indicating a selection of one or more values corresponding to the one or more required parameters, and the executable search query is generated based at least in part on the received parameter selection input.

4. The apparatus of claim 1, wherein the search selection interface is configured to receive text search input, the text search input representing text search terms for searching from among the one or more search objects based at least in part on user-configurable text data associated with each of the one or more search objects.

5. The apparatus of claim 1, wherein the search selection interface is configured to receive the search selection input specifically with respect to a subset of the one or more search objects that is associated with the particular extensible object model and/or a current user.

6. The apparatus of claim 1, wherein the at least one non-transitory memory and the program code are configured to, with the at least one processor, further cause the apparatus to at least:
   present a search configuration interface configured to receive search configuration input for creating new search objects to add to the one or more search objects or for modifying existing search objects of the one or more search objects;
   receive, via the search configuration interface, the search configuration input; and
   generate or modify a search object of the one or more search objects based at least in part on the received search configuration input.

7. The apparatus of claim 6, wherein the search configuration interface comprises at least one interactable element for receiving a user-configurable display name, of the search configuration input, to be assigned to a search object of the one or more search objects.

8. The apparatus of claim 1, wherein the at least one non-transitory memory and the program code are configured to, with the at least one processor, further cause the apparatus to at least:
   in response to detecting a change to a modified extensible object model of the one or more extensible object models, update at least one search object, of the one or more search objects, associated with the modified extensible object model based at least in part on the detected change.

9. The apparatus of claim 1, wherein at least one search object of the one or more search objects is associated with version data indicating one or more versions of each of the one or more extensible object models with which the at least one search object is compatible, and the search selection interface is presented based at least in part on the version data.

10. The apparatus of claim 1, wherein the executable search query is defined in a query language associated with a graph database in which the one or more extensible object models are stored, and the one or more search objects stored in the search object database are defined in a file or data interchange format.

11. A computer-implemented method comprising:
   presenting a search selection interface configured to receive search selection input indicating a selected search object of one or more search objects stored in a search object database associated with one or more extensible object models representing one or more operational systems, wherein each search object of the one or more search objects defines a type of search operation to be performed with respect to the one or more extensible object models;
   receiving, via the search selection interface, search selection input associated with a particular extensible object model of the one or more extensible object models;
   retrieving from the search object database the selected search object indicated by the received search selection input;

generating an executable search query representing a particular instance of the type of search operation defined by the selected search object retrieved from the search object database based at least in part on the selected search object;

submitting the executable search query for execution against the particular extensible object model;

receiving object model data resulting from the execution of the executable search query against the particular extensible object model, wherein the object model data comprises a portion of the particular extensible object model;

generating search results data based at least in part on the received object model data; and presenting a results interface for displaying the search results data.

12. The method of claim 11, wherein each search object of the one or more search objects comprises a user-configurable display name.

13. The method of claim 11, wherein at least one search object of the one or more search objects comprises one or more required parameters required by the type of search operation defined by the at least one search object, the search selection interface is configured to receive parameter selection input with respect to the at least one search object and the particular extensible object model, the parameter selection input indicating a selection of one or more values corresponding to the one or more required parameters, and the executable search query is generated based at least in part on the received parameter selection input.

14. The method of claim 11, wherein the search selection interface is configured to receive text search input of the search selection input, the text search input representing text search terms for searching from among the one or more search objects based at least in part on user-configurable text data associated with each of the one or more search objects.

15. The method of claim 11, wherein the search selection interface is configured to receive the search selection input specifically with respect to a subset of the one or more search objects that is associated with the particular extensible object model and/or a current user.

16. The method of claim 11, further comprising:
presenting a search configuration interface configured to receive search configuration input for creating new search objects to add to the one or more search objects or for modifying existing search objects of the one or more search objects;
receiving, via the search configuration interface, the search configuration input; and
generating or modifying a search object of the one or more search objects based at least in part on the received search configuration input.

17. The method of claim 16, wherein the search configuration interface comprises at least one interactable element for receiving a user-configurable display name, of the search configuration input, to be assigned to a search object of the one or more search objects.

18. The method of claim 11, further comprising:
in response to detecting a change to a modified extensible object model of the one or more extensible object models, updating at least one search object, of the one or more search objects, associated with the modified extensible object model based at least in part on the detected change.

19. The method of claim 11, wherein at least one search object of the one or more search objects is associated with version data indicating one or more versions of each of the one or more extensible object models with which the at least one search object is compatible, and the search selection interface is presented based at least in part on the version data.

20. A computer program product comprising at least one non-transitory computer-readable storage medium having computer-readable program code portions stored therein, the computer-readable program code portions comprising an executable portion configured to:

Present a search selection interface configured to receive search selection input indicating a selected search object of one or more search objects stored in a search object database associated with one or more extensible object models representing one or more operational systems, wherein each search object of the one or more search objects defines a type of search operation to be performed with respect to the one or more extensible object models;

receive, via the search selection interface, search selection input associated with a particular extensible object model of the one or more extensible object models;

retrieve from the search object database the selected search object indicated by the received search selection input;

generate an executable search query representing a particular instance of the type of search operation defined by the selected search object retrieved from the search object database based at least in part on the selected search object;

submit the executable search query for execution against the particular extensible object model;

receive object model data resulting from the execution of the executable search query against the particular extensible object model, wherein the object model data comprises a portion of the particular extensible object model;

generate search results data based at least in part on the received object model data; and present a results interface for displaying the search results data.

* * * * *